(12) United States Patent
Nishimura et al.

(10) Patent No.: US 11,273,513 B2
(45) Date of Patent: Mar. 15, 2022

(54) COUPLING DEVICE

(71) Applicant: Shinjo Holdings Co., Ltd., Osaka (JP)

(72) Inventors: Rikiya Nishimura, Kishiwada (JP); Etsuo Masunaga, Kishiwada (JP)

(73) Assignee: SHINKO HOLDINGS CO., LTD., Osaka (JP)

( * ) Notice: Subject to any disclaimer, the term of this patent is extended or adjusted under 35 U.S.C. 154(b) by 346 days.

(21) Appl. No.: 16/286,603

(22) Filed: Feb. 27, 2019

(65) Prior Publication Data

US 2019/0193189 A1 Jun. 27, 2019

Related U.S. Application Data

(63) Continuation of application No. PCT/JP2016/075105, filed on Aug. 27, 2016.

(51) Int. Cl.
*B23K 11/20* (2006.01)
*B21J 15/00* (2006.01)
(Continued)

(52) U.S. Cl.
CPC ............... *B23K 11/20* (2013.01); *B21J 15/00* (2013.01); *B23K 11/115* (2013.01); *B23K 2103/02* (2018.08); *B23K 2103/10* (2018.08)

(58) Field of Classification Search
CPC .... B21J 15/00; B23K 11/0066; B23K 11/115; B23K 11/20; B23K 2103/02; B23K 2103/10; B23K 2103/20
(Continued)

(56) References Cited

U.S. PATENT DOCUMENTS

2009/0294410 A1 12/2009 Iwase et al.
2015/0258624 A1 9/2015 Draht et al.
(Continued)

FOREIGN PATENT DOCUMENTS

JP 08-33987 2/1996
JP 2009-285678 12/2009
(Continued)

OTHER PUBLICATIONS

Extended European Search Report for corresponding EP Application No. 16915033.1-1016, dated Apr. 8, 2020.
(Continued)

*Primary Examiner* — Dana Ross
*Assistant Examiner* — Joseph W Iskra
(74) *Attorney, Agent, or Firm* — Mori & Ward, LLP

(57) ABSTRACT

A coupling device couples, using a coupling member, a first plate of a first metal to a second plate of a second metal. A power source is connected to first and second electrodes. A driver moves the first and second electrodes relative to the coupling member and the first and second plates. A controller controls the power source and the driver to electrify the coupling member and the first and second plates under pressure. The coupling member includes a third metal approximately identical to the second metal. The first metal has a melting point lower than melting points of the second and third metals. The coupling member includes a pilot portion that is located about a center of a flat surface of a body of the coupling member and that protrudes in an extending direction. The flat surface has discharge grooves radially extending from the pilot portion.

6 Claims, 40 Drawing Sheets

(51) Int. Cl.
    *B23K 11/11*         (2006.01)
    *B23K 103/10*       (2006.01)
    *B23K 103/02*       (2006.01)

(58) Field of Classification Search
    USPC ........................................................ 219/86.1
    See application file for complete search history.

(56) References Cited

U.S. PATENT DOCUMENTS

2016/0123362 A1    5/2016   Iwase
2016/0167158 A1*  6/2016   Spinella ............. B23K 11/3009
                                                                 403/270

FOREIGN PATENT DOCUMENTS

| JP | 2015-042417 | 3/2015 | |
|----|-------------|--------|---|
| WO | WO 2013/064618 | 5/2013 | |
| WO | WO2013064618 | * | 5/2013 |
| WO | WO 2016/100179 | 6/2016 | |

OTHER PUBLICATIONS

International Search Report for corresponding International Application No. PCT/JP2016/075105, dated Feb. 7, 2017.
Written Opinion for corresponding International Application No. PCT/JP2016/075105, dated Feb. 7, 2017.
Japanese Office Action for corresponding JP Application No. 2017-510416, dated Nov. 13, 2017 (w/ English machine translation).
Japanese Office Action for corresponding JP Application No. 2017-510416, dated May 15, 2018 (w/ English machine translation).
Chinese Office Action for corresponding CN Application No. 201680088788.3, dated Jul. 2, 2020 (w/ English machine translation).
Chinese Office Action for corresponding CN Application No. 201680088788.3, dated Feb. 25, 2021 (w/ English machine translation).

* cited by examiner

COUPLING DEVICE

CROSS-REFERENCE TO RELATED APPLICATIONS

The present application is a continuation application of International Application No. PCT/JP2016/075105, filed Aug. 27, 2016. The contents of this application are incorporated herein by reference in their entirety.

BACKGROUND OF THE INVENTION

Field of the Invention

The present invention relates to a coupling device.

Discussion of the Background

A technique of connecting different kinds of material together using an engagement piece is known. Specifically, JP 08-033987A includes pressurizing and electrifying, using electrodes, an iron plate, an aluminum plate, and an engagement piece with these plates and piece arranged in this order from top. This causes a portion of the aluminum plate contacting the engagement piece to melt, allowing the engagement piece to penetrate the aluminum plate. Then, the iron plate and the leading end of the engagement piece are subjected to resistance welding. Thus, the engagement piece is used as a coupling member to couple (fasten) the iron plate and the aluminum plate to each other.

SUMMARY OF THE INVENTION

According to one aspect of the present invention, a coupling device is configured to, using a coupling member, couple a first plate made of a first metal and a second plate made of a second metal to each other. The coupling device includes a first electrode, a second electrode, a power source, a driver, and a controller. The power source is connected to the first electrode and the second electrode. The driver is configured to move the first electrode and the second electrode relative to the coupling member, the first plate, and the second plate. The controller is configured to control the power source and the driver to electrify the coupling member, the first plate, and the second plate while controlling the first electrode and the second electrode to apply pressure to the coupling member, the first plate, and the second plate. The coupling member is made of a third metal approximately identical to the second metal. The first metal has a melting point lower than a melting point of the second metal and a melting point of the third metal. The coupling member includes a body and a pilot portion. The pilot portion is provided approximately at a center of a flat surface of the body and protrudes in an extending direction. On the flat surface, a plurality of discharge grooves are formed radially extending from the pilot portion. The controller is configured to make the coupling member, the first plate, and the second plate held between the first plate and the second plate so as to make a contact state between: a leading end of the first electrode and the body of the coupling member; the pilot portion of the coupling member and a first main surface of the first plate; a second main surface of the first plate and a first main surface of the second plate; and a second main surface of the second plate and a leading end of the second electrode. The controller is configured to, while maintaining the contact state, control the power source to electrify the coupling member, the first plate, and the second plate while controlling the driver to apply pressure to the coupling member, the first plate, and the second plate so as to: melt a facing portion of the first plate facing the pilot portion of the coupling member, and remove the melted facing portion to a farther side of the pilot portion through the plurality of discharge grooves formed on the coupling member, whereby the facing portion is removed, allowing a leading end of the pilot portion and a joint portion of the second plate to contact each other; and melt and solidify the leading end of the pilot portion and the joint portion of the second plate to couple the leading end of the pilot portion and the joint portion of the second plate to each other.

According to another aspect of the present invention, a coupling device is configured to, using a coupling member, couple a first plate made of a first metal and a second plate made of a second metal to each other. The coupling device includes a first electrode, a second electrode, a power source, a driver, and a controller. The power source is connected to the first electrode and the second electrode. The driver is configured to move the first electrode and the second electrode relative to the coupling member, the first plate, and the second plate. The controller is configured to control the power source and the driver to electrify the coupling member, the first plate, and the second plate while controlling the first electrode and the second electrode to apply pressure to the coupling member, the first plate, and the second plate. The coupling member is made of a third metal approximately identical to the second metal. The first metal has a melting point lower than a melting point of the second metal and a melting point of the third metal. The coupling member includes a body, a pilot portion, and a ring-shaped wall. The pilot portion is provided approximately at a center of a flat surface of the body and protrudes in an extending direction. The ring-shaped wall is provided along an outer circumference of the flat surface. The pilot portion, the body, and the ring-shaped wall define a groove space, and, on an end surface of the ring-shaped wall, a plurality of notch-shaped discharge grooves are formed. The controller is configured to make the coupling member, the first plate, and the second plate held between the first plate and the second plate so as to make a contact state between: a leading end of the first electrode and the body of the coupling member; the pilot portion of the coupling member and a first main surface of the first plate; a second main surface of the first plate and a first main surface of the second plate; and a second main surface of the second plate and a leading end of the second electrode. The controller is configured to, while maintaining the contact state, control the power source to electrify the coupling member, the first plate, and the second plate while controlling the driver to apply pressure to the coupling member, the first plate, and the second plate so as to: melt a facing portion of the first plate facing the pilot portion of the coupling member, and remove the melted facing portion into the groove space of the coupling member, whereby the facing portion is removed, allowing a leading end of the pilot portion and a joint portion of the second plate to contact each other; and melt and solidify the leading end of the pilot portion and the joint portion of the second plate to couple the leading end of the pilot portion and the joint portion of the second plate to each other.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
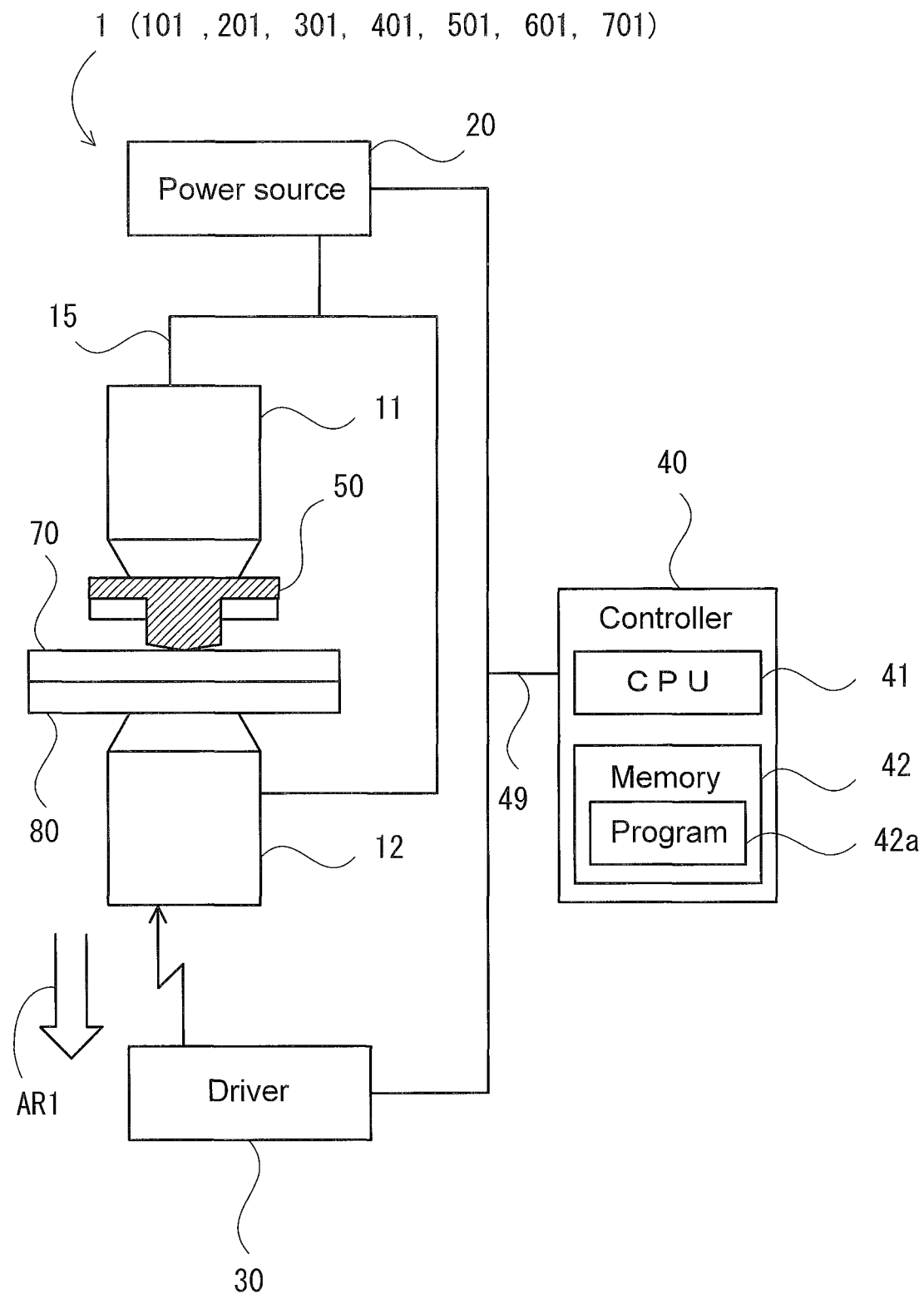
FIG. 1 is a diagram illustrating an exemplary configuration of coupling devices according to first to eighth embodiments of the present invention.
Figure 2:
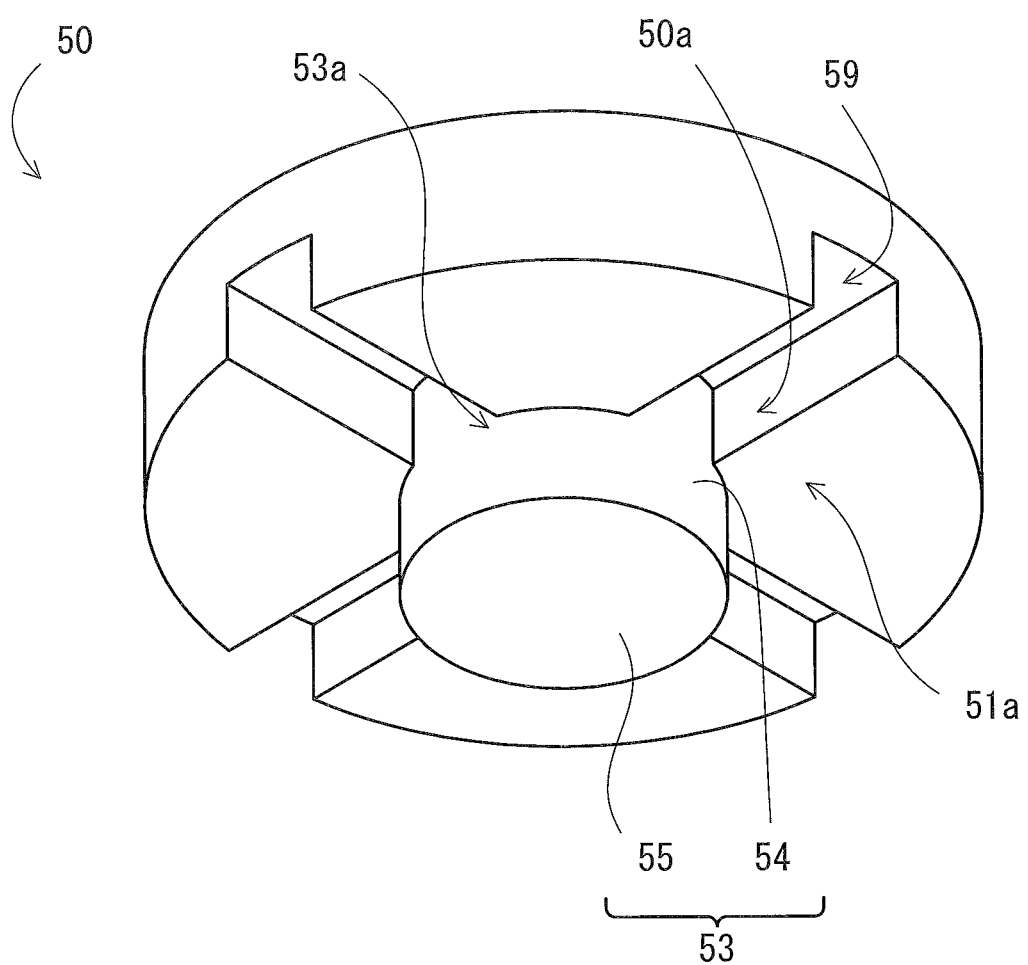
FIG. 2 is a perspective view of a coupling member according to the first embodiment of the present invention.
Figure 3:
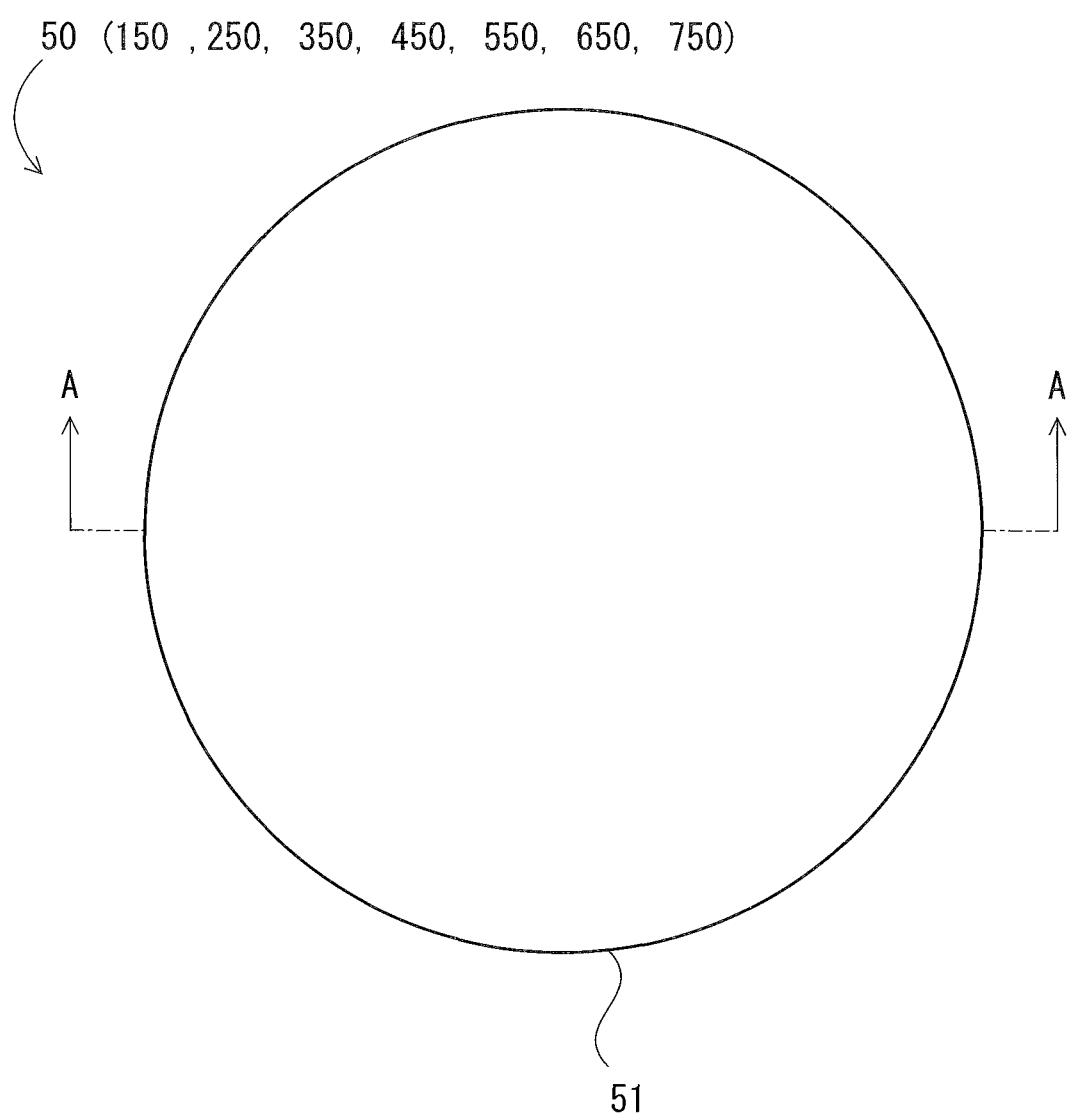
FIG. 3 is a plan view of coupling members according to the first to eighth embodiments of the present invention.
Figure 4:
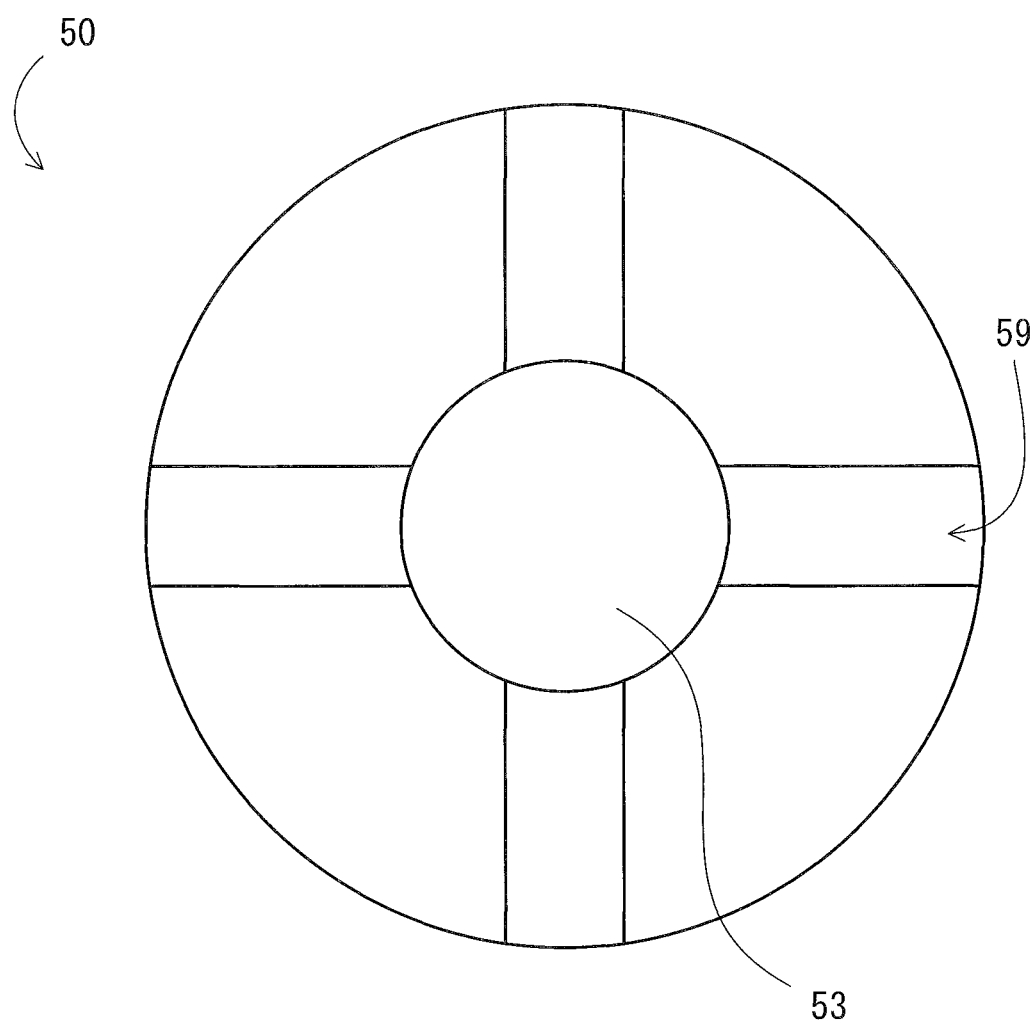
FIG. 4 is a bottom view of the coupling member according to the first embodiment of the present invention.
Figure 5:
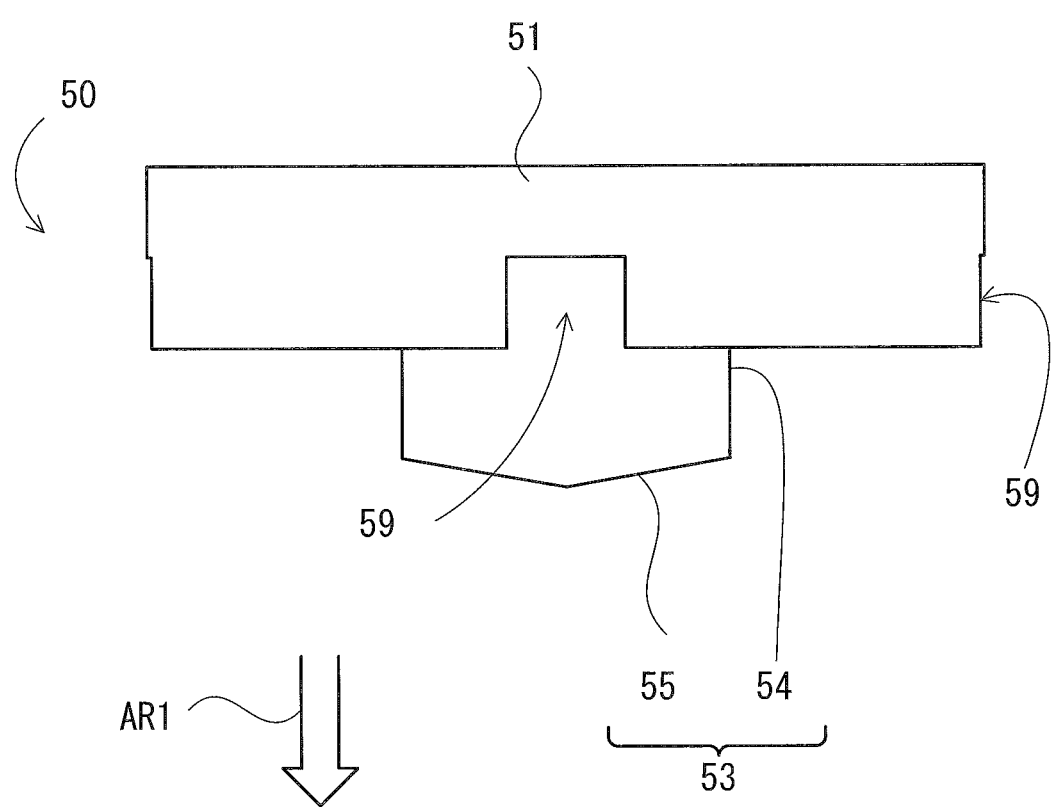
FIG. 5 is a front view of the coupling member according to the first embodiment of the present invention.

The embodiments will now be described with reference to the accompanying drawings, wherein like reference numerals designate corresponding or identical elements throughout the various drawings.

1. First Embodiment 1.1. Configuration of Coupling Device

FIG. 1 is a diagram illustrating an exemplary configuration of a coupling device 1 according to the first embodiment of the present invention. The coupling device 1 couples a first plate 70 and a second plate 80 to each other using a coupling member 50. The first plate 70 is made of a first metal, and the second plate 80 is made of a second metal. As illustrated in FIG. 1, the coupling device 1 mainly includes an electrode 11 (first electrode), an electrode 12 (second electrode), a power source 20, a driver 30, and a controller 40.

The coupling member 50 is made of a third metal approximately identical to the second metal. The first metal has a melting point lower than the melting point of the second metal and the melting point of the third metal. The first metal may be a light alloy material, non-limiting examples including aluminum, aluminum alloy (such as JIS 2000 type, JIS 3000 type, JIS 4000 type, JIS 5000 type, JIS 6000 type, and JIS 7000 type), magnesium, and magnesium alloy. The second and third metals may be a steel material, non-limiting examples including high-tensile steel material, galvanized steel plate, and stainless.

The power source 20 is connected to the electrodes 11 and 12 through a power source line 15. This configuration enables the power source 20 to electrify the coupling member 50, the first plate 70, and the second plate 80 that are held between the electrodes 11 and 12.

The driver 30 moves the electrodes 11 and 12 in vertical directions (which correspond to forward direction and inverse direction of arrow AR1) relative to the coupling member 50, the first plate 70, and the second plate 80. This configuration enables the electrodes 11 and 12 to hold the coupling member 50, the first plate 70, and the second plate 80 between the electrodes 11 and 12.

The controller 40 is electrically connected to the power source 20 and the driver 30 through a signal line 49 so as to control the power source 20 and the driver 30. As illustrated in FIG. 1, the controller 40 mainly includes a CPU 41 and a memory 42. The memory 42 stores therein a program 42a, and in accordance with the program 42a, the CPU 41 controls the power source 20 and the driver 30 at predetermined timings.

For example, the controller 40 controls the power source 20 to electrify the coupling member 50, the first plate 70, and the second plate 80 while controlling the driver 30 to move the electrodes 11 and 12 to apply pressure to the coupling member 50, the first plate 70, and the second plate 80.

1.2. Configuration of Coupling Member

Figure 6:
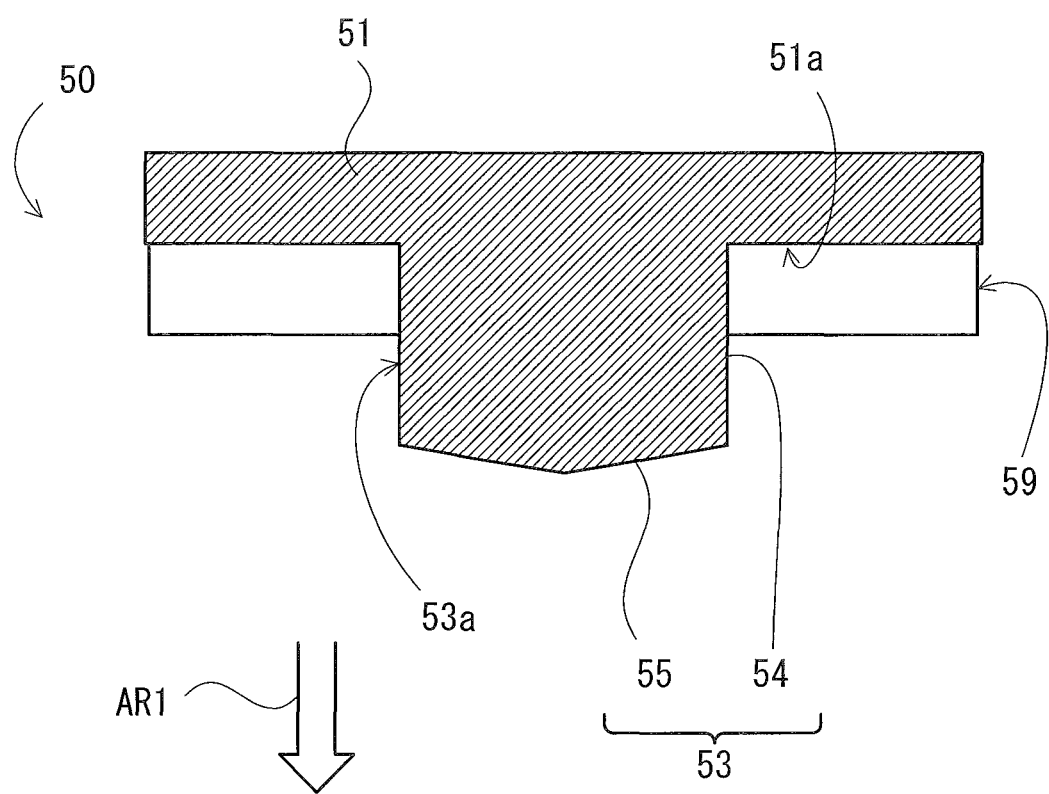
FIG. 6 is a cross-sectional view, taken along the line A-A illustrated in FIG. 3, of the coupling member according to the first embodiment of the present invention.

FIGS. 2 to 5 are respectively a perspective view, a plan view, a bottom view, and a front view of the coupling member 50 according to the first embodiment. FIG. 6 is a cross-sectional view, taken along the line A-A illustrated in FIG. 3, of the coupling member 50. The coupling member 50 couples (fastens) the first plate 70 and the second plate 80 to each other by resistance welding. As illustrated in FIGS. 2 to 6, the coupling member 50 mainly includes a body 51 and a pilot portion 53.

The body 51 is a circular flat plate. The pilot portion 53 is provided approximately at the center of a flat surface 51a of the body 51, and protrudes in the arrow AR1 direction (a direction parallel to the arrow AR1 will be hereinafter occasionally referred to as "extending direction"). Also, on the flat surface 51a, a plurality (four, in the first embodiment) of discharge grooves 59 are formed radially extending from the pilot portion 53.

As illustrated in FIG. 6, a leading end 55 of the pilot portion 53 has a conical shape. A body 54 of the pilot portion 53 has an outer circumference length in the direction perpendicular to the extending direction, and the outer circumference length is approximately uniform throughout an outer circumference surface 53a.

1.3. Method of Coupling Using Coupling Member

Figure 7:
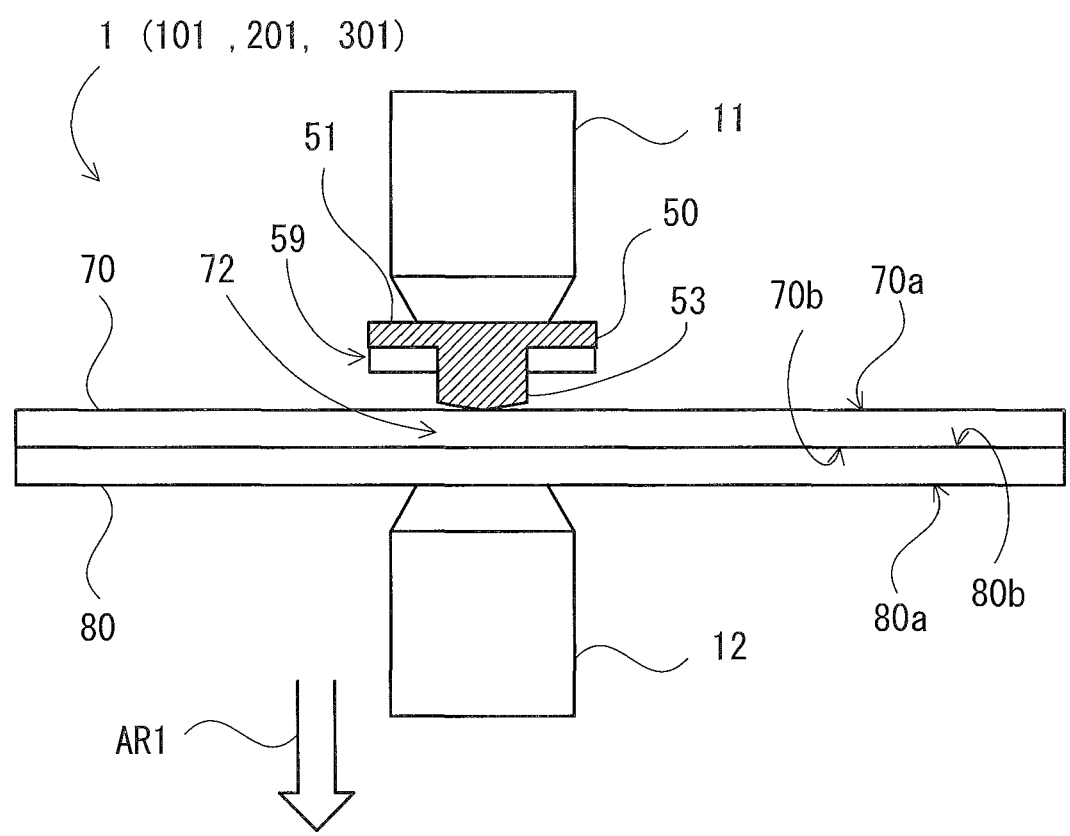
FIG. 7 illustrates a method of coupling using the coupling member according to the first to the fourth embodiments of the present invention.
Figure 8:
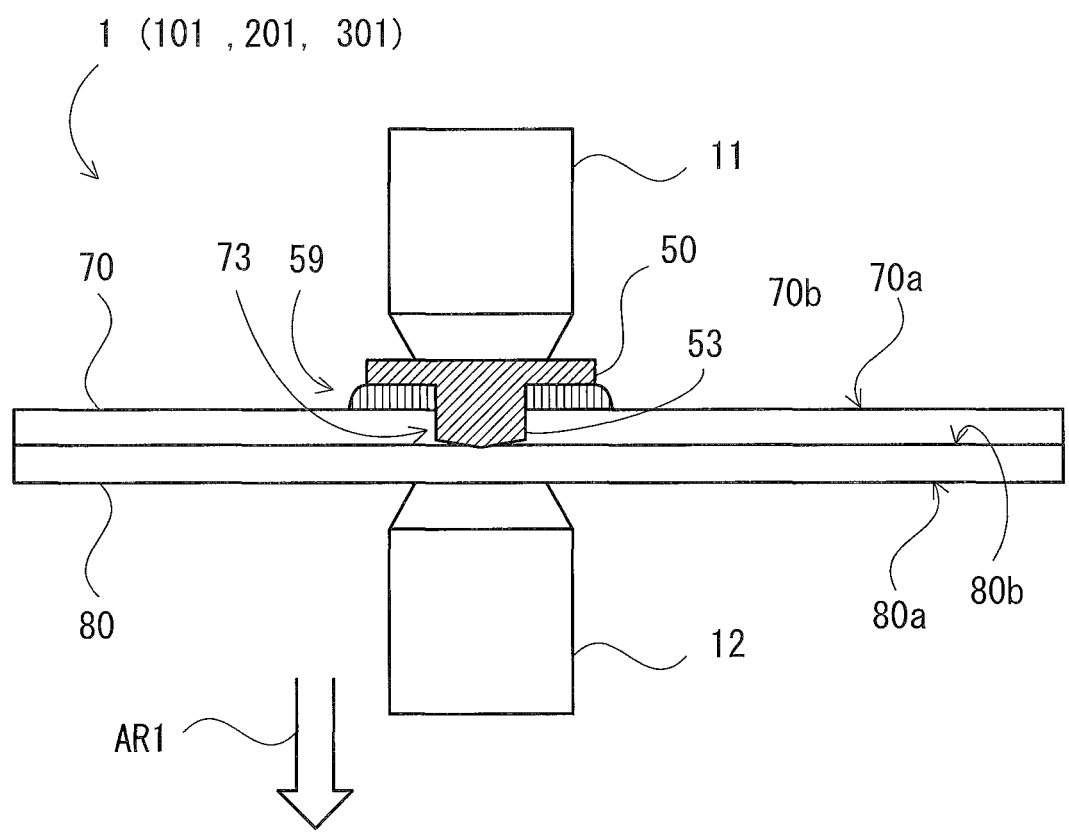
FIG. 8 illustrates a method of coupling using the coupling member according to the first to the fourth embodiments of the present invention.
Figure 9:
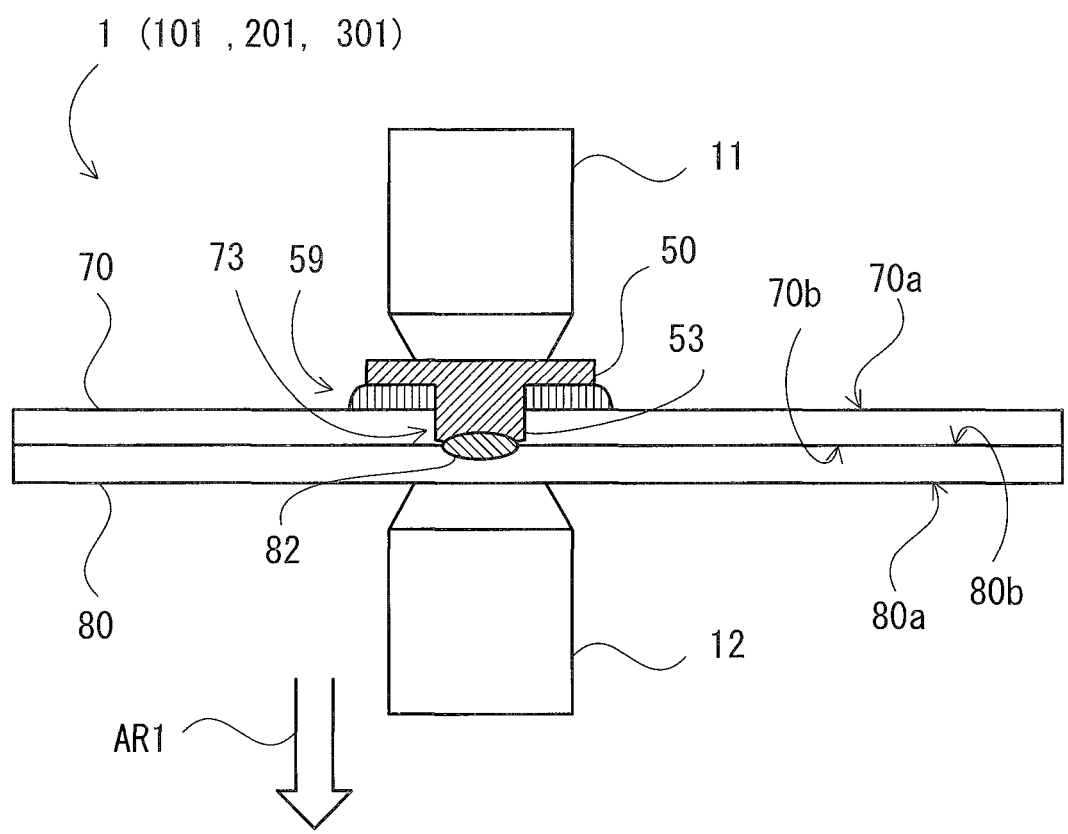
FIG. 9 illustrates a method of coupling using the coupling member according to the first to the fourth embodiments of the present invention.
Figure 10:
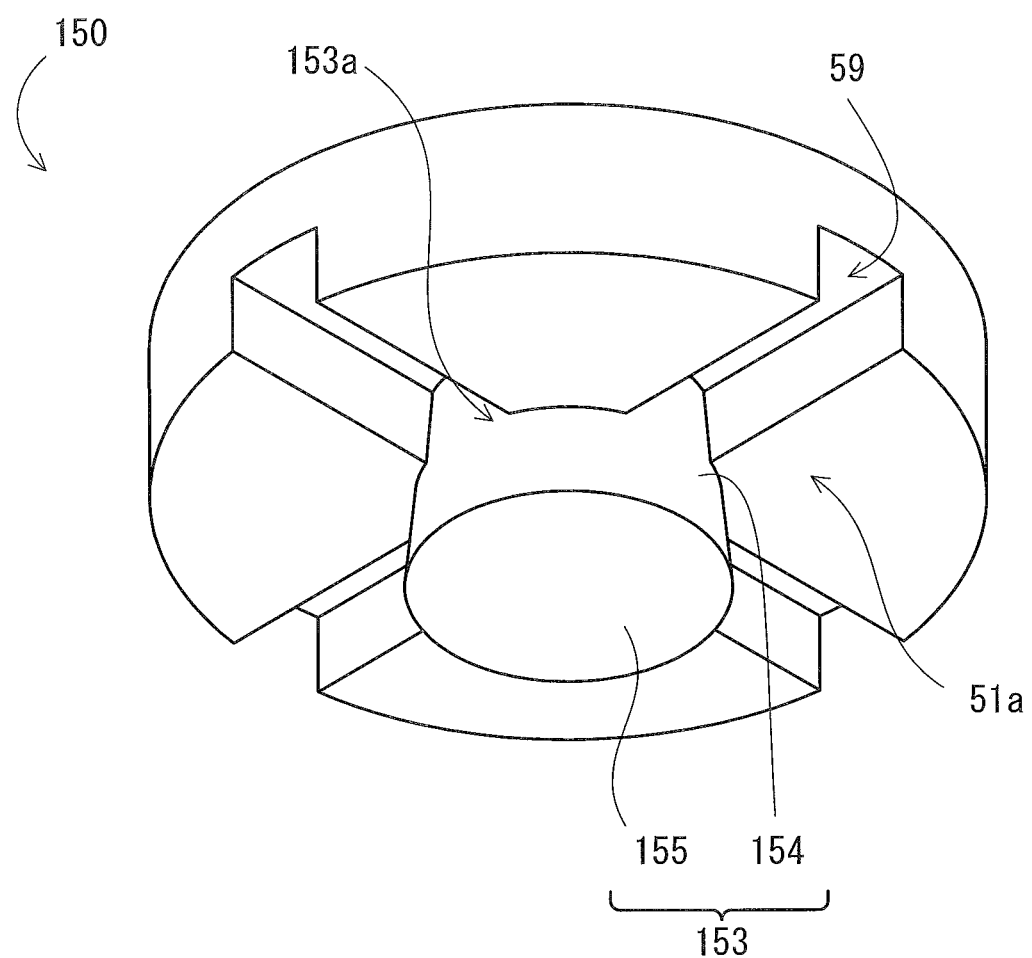
FIG. 10 is a perspective view of a coupling member according to a second embodiment of the present invention.
Figure 11:
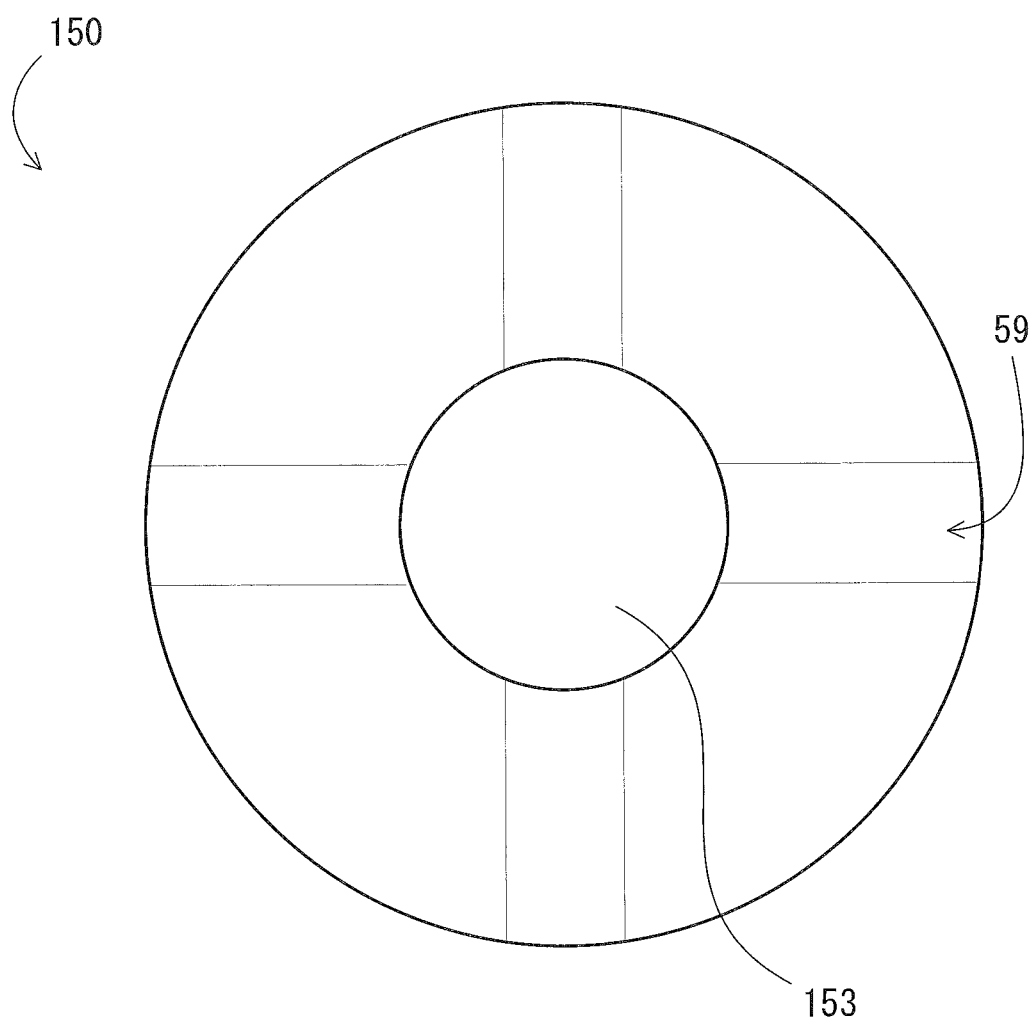
FIG. 11 is a bottom view of the coupling member according to the second embodiment of the present invention.
Figure 12:
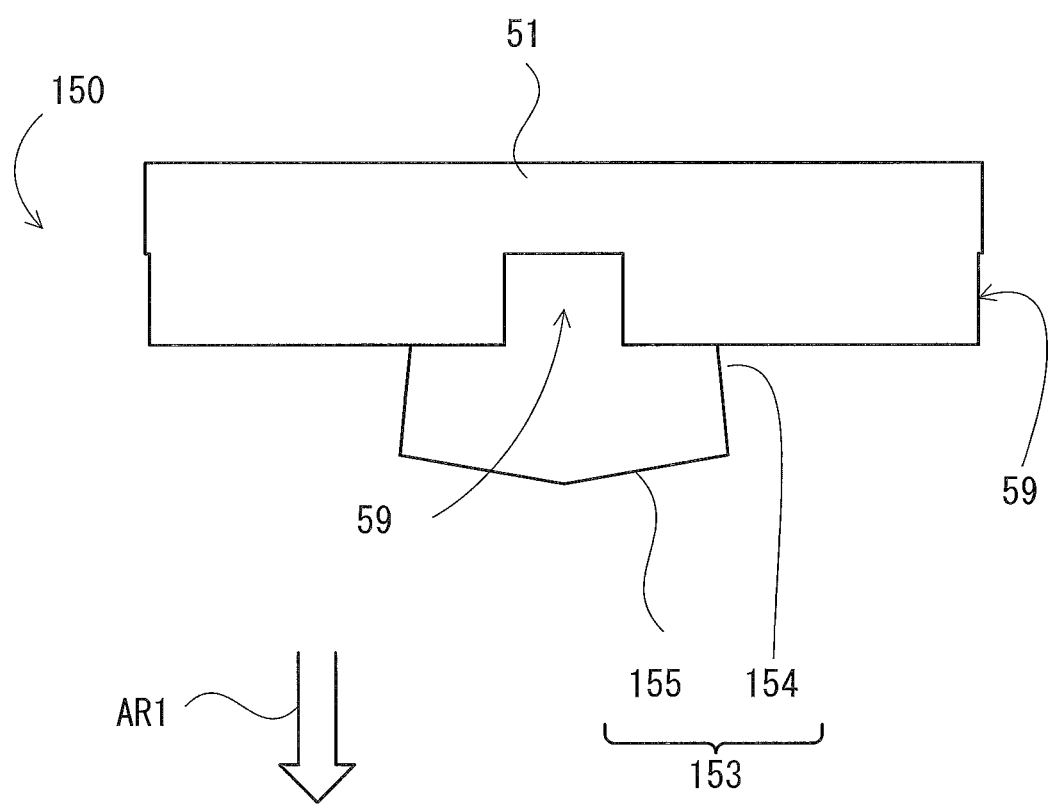
FIG. 12 is a front view of the coupling member according to the second embodiment of the present invention.

FIGS. 7 to 9 illustrate a method of coupling using the coupling member 50. In this method of coupling, first, the electrode 11 is moved to a position at the side of the coupling member 50, and the electrode 12 is moved to a position at the side of the second plate 80. This causes the coupling member 50, the first plate 70, and the second plate 80 to held between the electrodes 11 and 12.

This results in the contact state illustrated in FIG. 7. Specifically:

(1) the leading end of the electrode 11 and the body 51 of the coupling member 50 are in contact with each other;

(2) the pilot portion 53 of the coupling member 50 and a first main surface 70a of the first plate 70 are in contact with each other;

(3) a second main surface 70b of the first plate 70 and a first main surface 80a of the second plate 80 are in contact with each other, and (4) a second main surface 80b of the second plate 80 and the leading end of the electrode 12 are in contact with each other.

As used herein, the term "main surface" of the first plate 70 refers to a main surface among the outer surfaces of the first plate 70. In the example illustrated in FIG. 7, the first main surface 70a refers to a plane with a normal vector in the extending direction (the arrow AR1 direction). Also, the second main surface 70b refers to the surface opposite to the first main surface 70a.

Similarly, the term "main surface" of the second plate 80 refers to a main surface among the outer surfaces of the second plate 80. In the example illustrated in FIG. 7, the first main surface 80a refers to a plane with a normal vector in the extending direction. Also, the second main surface 80b refers to the surface opposite to the first main surface 80a.

Then, with the contact state (1) to (4) maintained, the controller 40 controls the power source 20 to electrify the coupling member 50, the first plate 70, and the second plate 80 while controlling the driver 30 to apply pressure to the coupling member 50, the first plate 70, and the second plate 80.

This causes a facing portion 72 (see FIG. 7) of the first plate 70, which faces the pilot portion 53 of the coupling member 50, to be melted, resulting in a through hole 73 (see FIG. 8) formed at a position corresponding to the facing portion 72. Also, the melted first metal of the facing portion 72 is discharged to a farther side of the pilot portion 53 through a plurality of discharge grooves 59 formed on the flat surface 51a (see vertical hatching illustrated in FIG. 8).

As a result of the melting of the facing portion 72, the leading end 55 of the pilot portion 53 and a joint portion 82 of the second plate 80 (see FIG. 9) come into contact with each other. Then, the leading end 55 and the joint portion 82 are melted and solidified by resistance welding, and thus are coupled to each other.

1.4. Advantages of Coupling Device According to First Embodiment

As has been described hereinbefore, in the coupling member 50 according to the first embodiment, on the flat surface 51a of the body 51, the plurality of discharge grooves 59 are formed radially extending from the pilot portion 53. Also, the facing portion 72 of the first plate 70 has a melting point lower than the melting point of the coupling member 50 and the melting point of the second plate 80. This ensures that when the coupling member 50, the first plate 70, and the second plate 80 are applied pressure and electrified, the facing portion 72 is melted and discharged into the discharge grooves 59 of the coupling member 50.

Melting and discharging the facing portion 72 to the discharge grooves 59 prevents the melted first metal from being left between the flat surface 51a of the coupling member 50 and the first plate 70. This, in turn, prevents the coupling member 50 from being removed from the first plate 70, and eliminates or minimizes insufficient contact between the flat surface 51a of the coupling member 50 and the first plate 70.

Melting and discharging the facing portion 72 into the discharge grooves 59 also ensures a sufficient level of contact between the pilot portion 53 of the coupling member 50 and the second plate 80. This leads to a sufficient level of coupling between the leading end 55 of the pilot portion 53 and the joint portion 82 of the second plate 80 implemented by resistance welding.

Additionally, the first plate 70 and the second plate 80, which have different melting points, are readily coupled to each other through a single pressure-electrification step.

2. Second Embodiment

The second embodiment of the present invention will be described. The coupling device 1 according to the first embodiment and a coupling device 101 according to the second embodiment are similar to each other in configuration except that the coupling member 50 of the coupling device 1 and a coupling member 150 of the coupling device 101 have different configurations. The following description will focus on those respects in which the coupling member 50 and the coupling member 150 are different from each other.

It is noted that identical reference numerals are used to denote identical or substantially identical components between the coupling devices 1 and 101, and these components have already been described in the first embodiment. To avoid redundancy, these components will not be elaborated upon in the following description.

Figure 13:
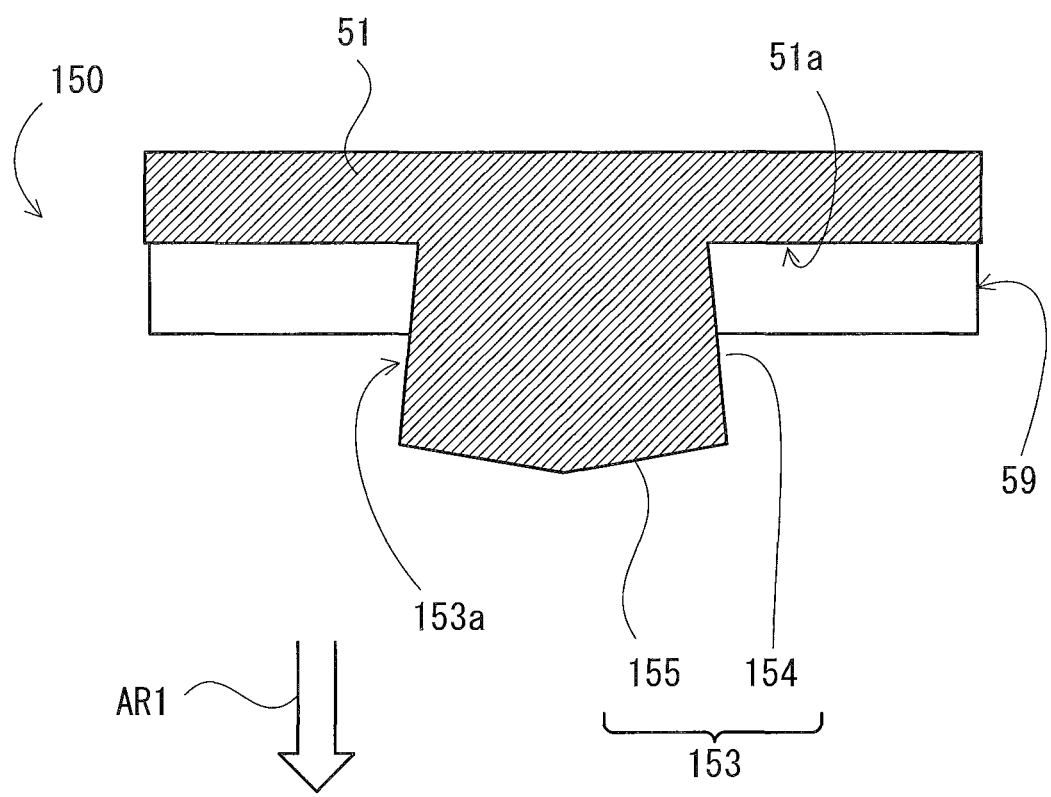
FIG. 13 is a cross-sectional view, taken along the line A-A illustrated in FIG. 3, of the coupling member according to the second embodiment of the present invention.
Figure 14:
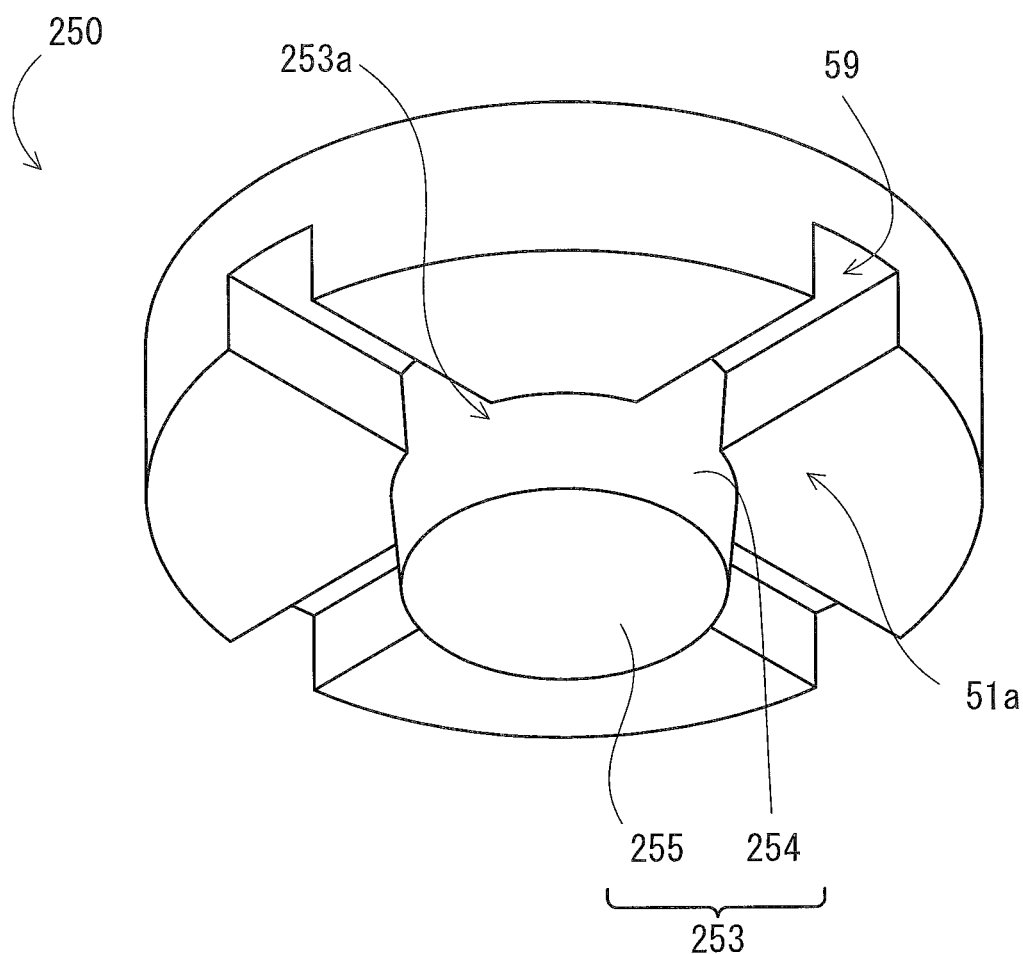
FIG. 14 is a perspective view of a coupling member according to a third embodiment of the present invention.
Figure 15:
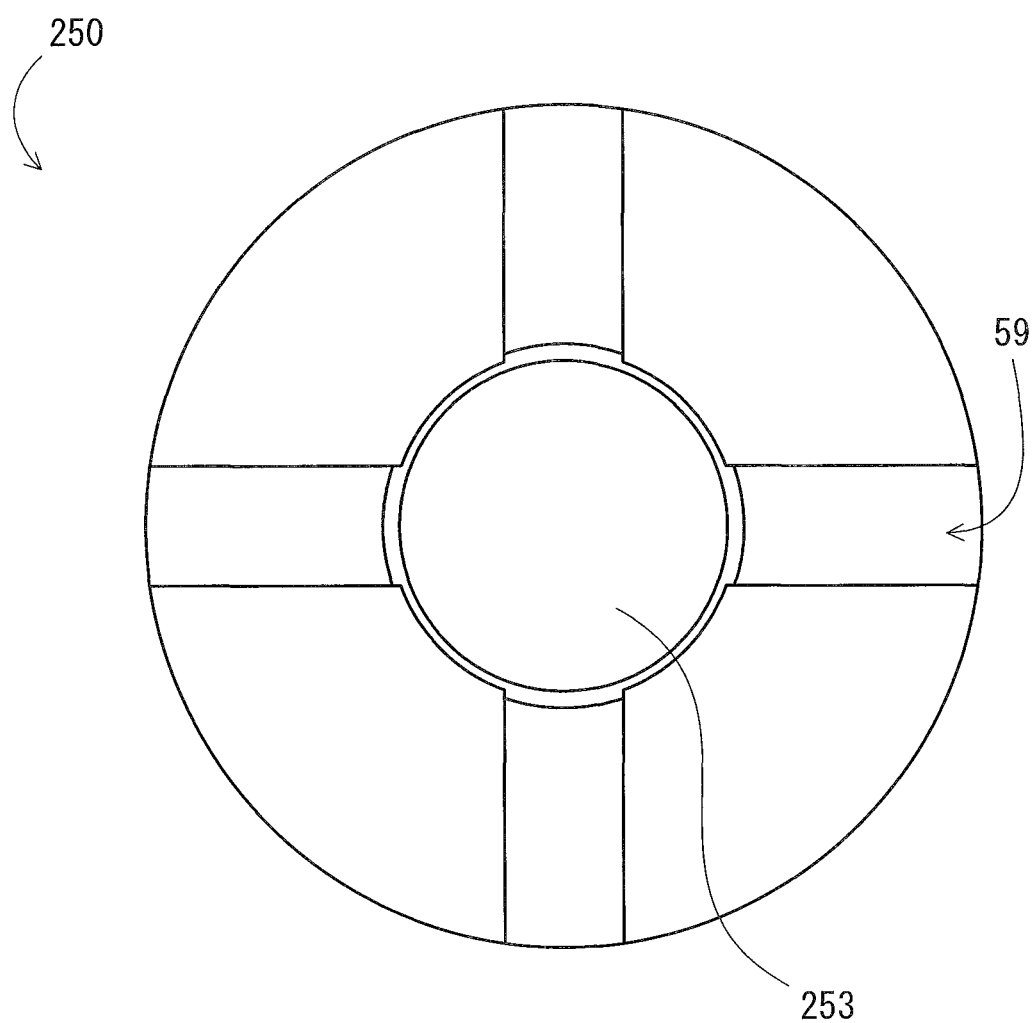
FIG. 15 is a bottom view of the coupling member according to the third embodiment of the present invention.
Figure 16:
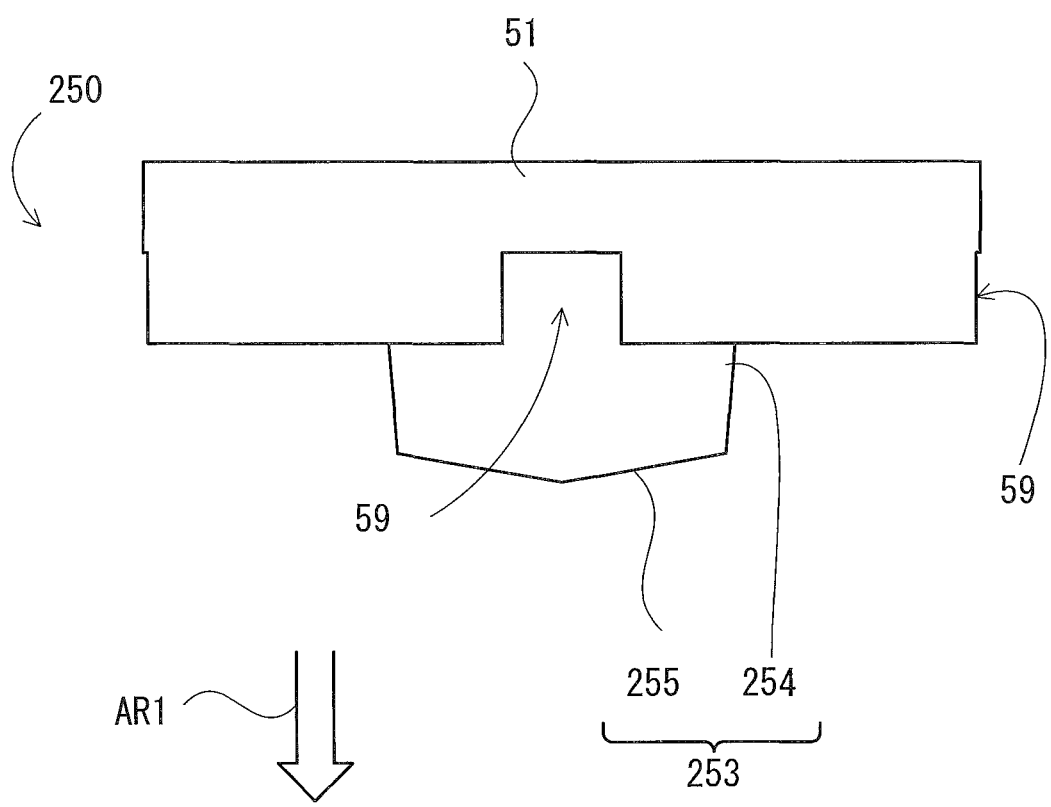
FIG. 16 is a front view of the coupling member according to the third embodiment of the present invention.

FIG. 3 and FIGS. 10 to 12 are respectively a plan view, a perspective view, a bottom view, and a front view of the coupling member 150 according to the second embodiment. FIG. 13 is a cross-sectional view, taken along the line A-A illustrated in FIG. 3, of the coupling member 150. The coupling member 150 couples (fastens) the first plate 70 and the second plate 80 to each other by resistance welding, similarly to the coupling member 50 according to the first embodiment. As illustrated in FIG. 3 and FIGS. 10 to 13, the coupling member 150 mainly includes the body 51 and a pilot portion 153.

The body 51 is a circular flat plate. The pilot portion 153 is provided approximately at the center of the flat surface 51a of the body 51, and protrudes in the extending direction. Also, on the flat surface 51a, a plurality (four, in the second embodiment) of discharge grooves 59 are formed radially extending from the pilot portion 153.

As illustrated in FIG. 13, a leading end 155 of the pilot portion 153 has a conical shape. A body 154 of the pilot portion 153 has an outer circumference length in the direction perpendicular to the extending direction, and the outer circumference length increases as the body 154 is further away from the flat surface 51a.

This configuration ensures that when the coupling member 150, the first plate 70, and the second plate 80 are applied pressure and electrified, the facing portion 72 of the first plate 70, which is lower in melting point than the coupling member 150 and the second plate 80, is melted and discharged to the farther side of the pilot portion 153 through the plurality of discharge grooves 59.

Melting and discharging the facing portion 72 to the farther side of the pilot portion 153 prevents the melted first metal from being left between the flat surface 51a of the coupling member 150 and the first plate 70. Melting and discharging the facing portion 72 to the farther side of the pilot portion 153 also ensures a sufficient level of contact between the pilot portion 153 of the coupling member 150 and the second plate 80. This leads to a sufficient level of coupling between the leading end 155 of the pilot portion 153 and the joint portion 82 of the second plate 80 implemented by resistance welding.

Additionally, the first plate 70 and the second plate 80, which have different melting points, are readily coupled to each other through a single pressure-electrification step.

3. Third Embodiment

The third embodiment of the present invention will be described. The coupling device 1 according to the first embodiment and a coupling device 201 according to the third embodiment are similar to each other in configuration except that the coupling member 50 of the coupling device 1 and a coupling member 250 of the coupling device 201 have different configurations. The following description will focus on those respects in which the coupling member 50 and the coupling member 250 are different from each other.

It is noted that identical reference numerals are used to denote identical or substantially identical components between the coupling devices 1 and 201, and these components have already been described in the first embodiment. To avoid redundancy, these components will not be elaborated upon in the following description.

Figure 17:
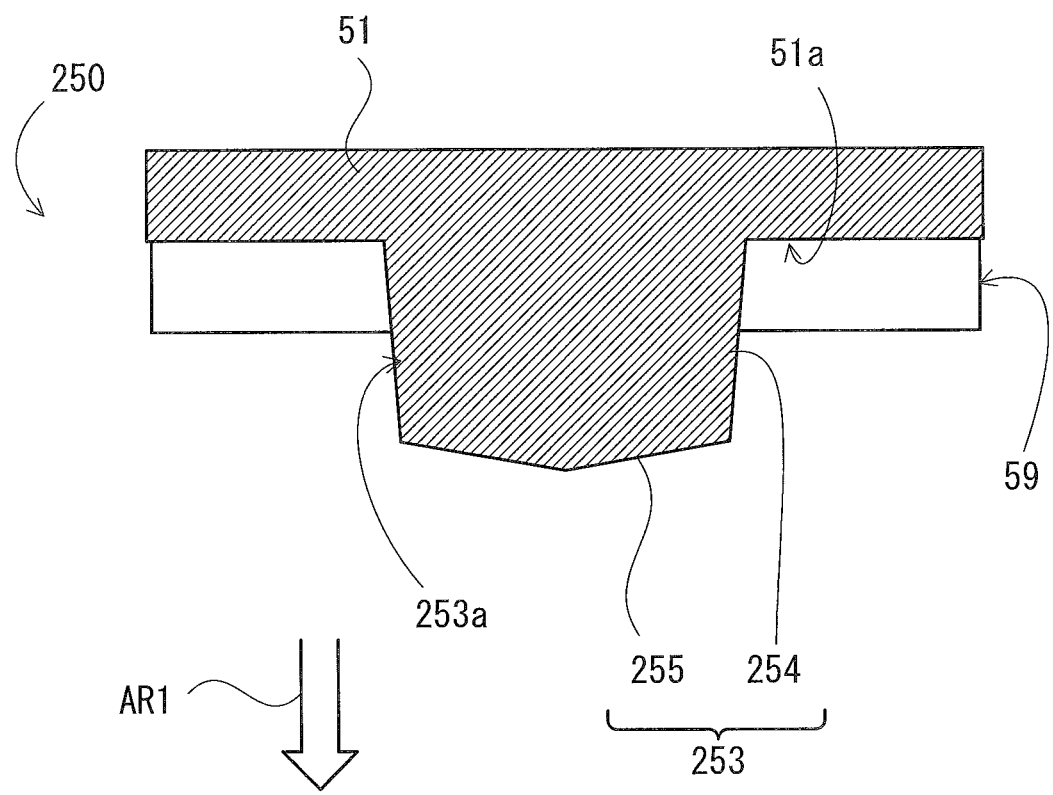
FIG. 17 is a cross-sectional view, taken along the line A-A illustrated in FIG. 3, of the coupling member according to the third embodiment of the present invention.
Figure 18:
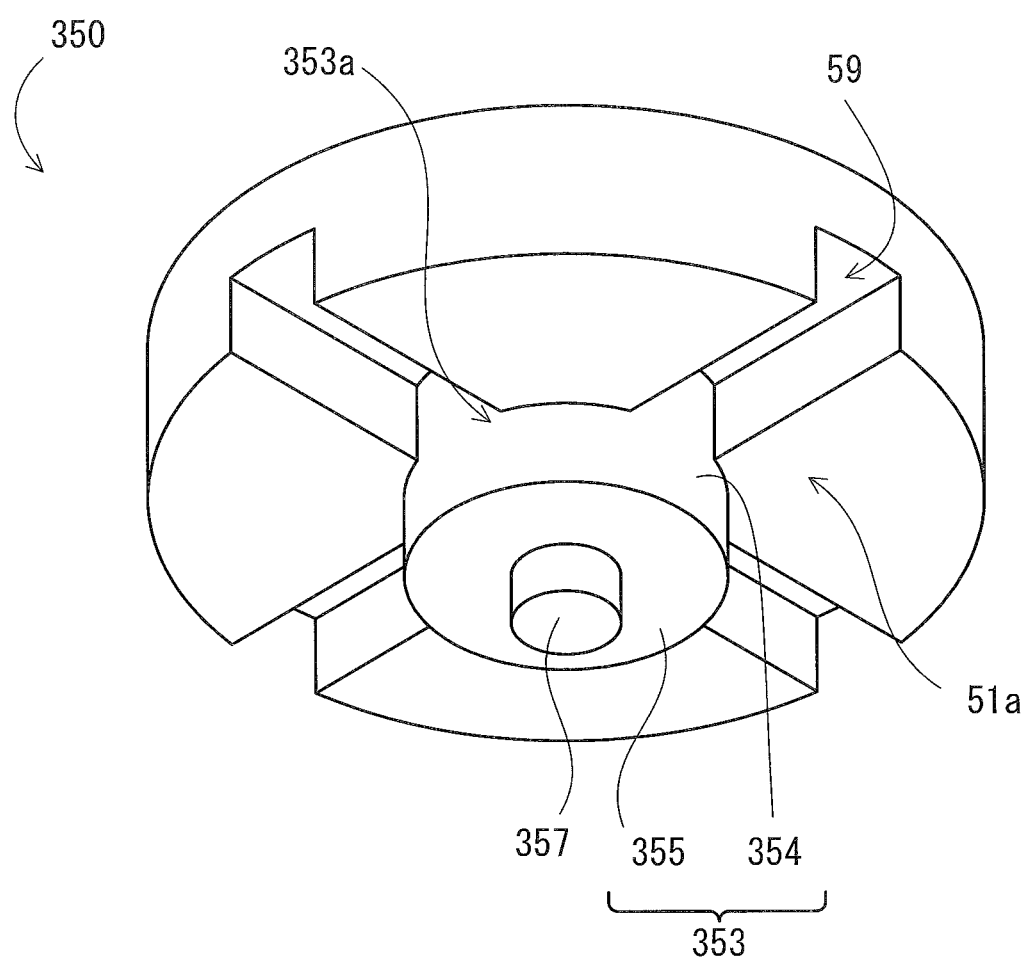
FIG. 18 is a perspective view of a coupling member according to a fourth embodiment of the present invention.
Figure 19:
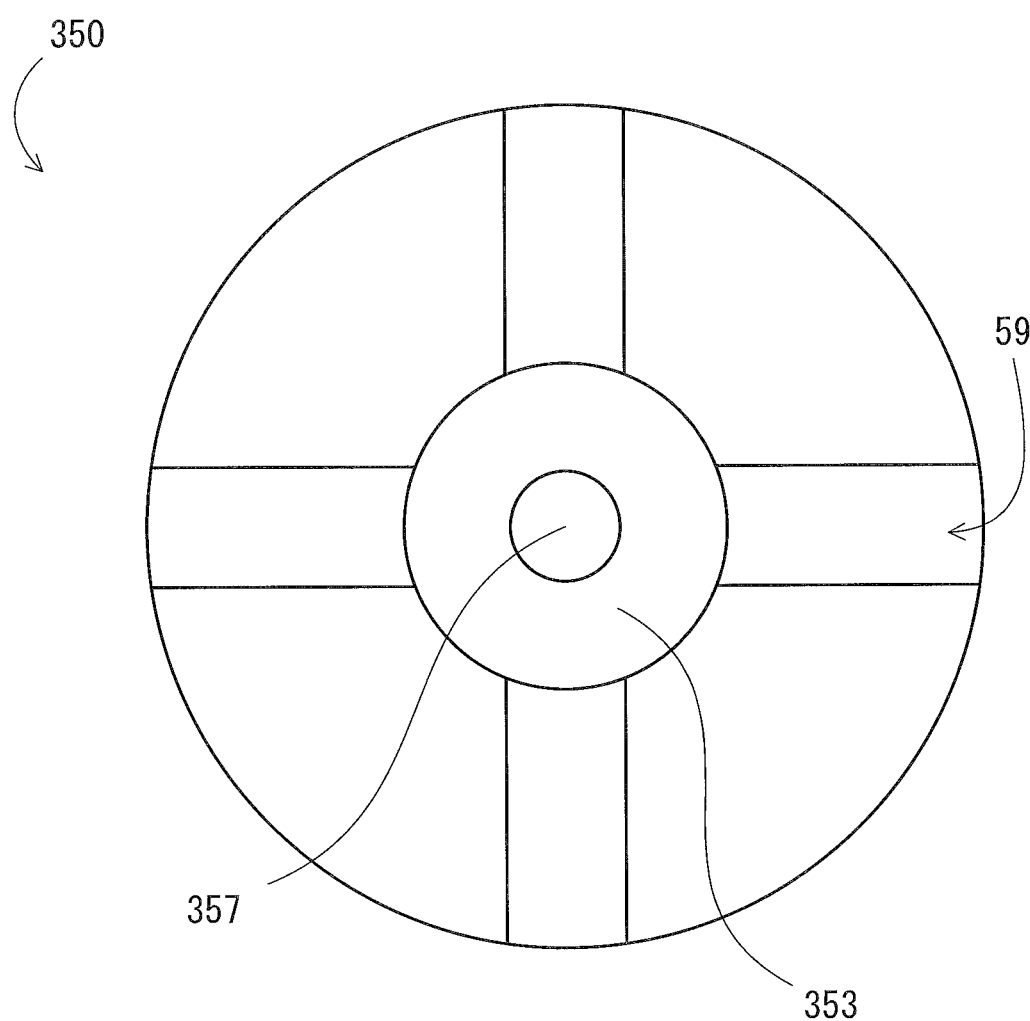
FIG. 19 is a bottom view of the coupling member according to the fourth embodiment of the present invention.
Figure 20:
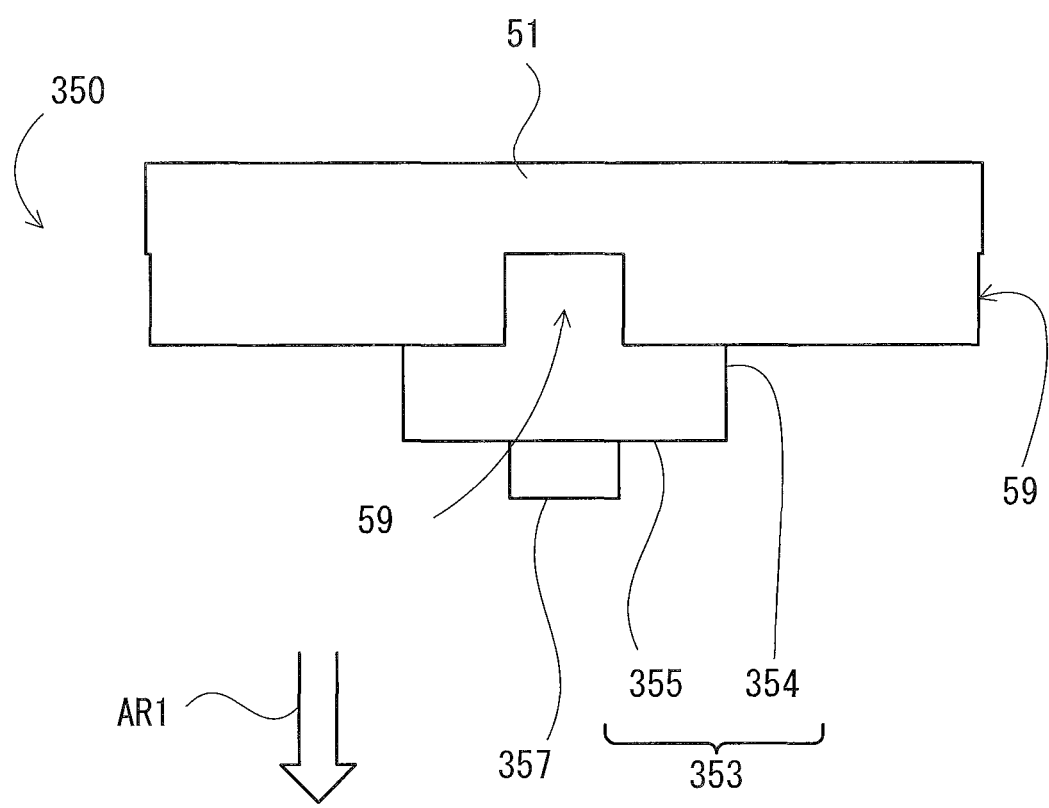
FIG. 20 is a front view of the coupling member according to the fourth embodiment of the present invention.

FIG. 3 and FIGS. 14 to 16 are respectively a plan view, a perspective view, a bottom view, and a front view of the coupling member 250 according to the third embodiment. FIG. 17 is a cross-sectional view, taken along the line A-A illustrated in FIG. 3, of the coupling member 250. The coupling member 250 couples (fastens) the first plate 70 and the second plate 80 to each other by resistance welding, similarly to the coupling member 50 according to the first embodiment. As illustrated in FIG. 3 and FIGS. 14 to 17, the coupling member 250 mainly includes the body 51 and the pilot portion 253.

The body 51 is a circular flat plate. The pilot portion 253 is provided approximately at the center of the flat surface 51a of the body 51, and protrudes in the extending direction. Also, on the flat surface 51a, a plurality (four, in the third embodiment) of discharge grooves 59 are formed radially extending from the pilot portion 253.

As illustrated in FIG. 17, the leading end 255 of the pilot portion 253 has a conical shape. A body 254 of the pilot portion 253 has an outer circumference length in the direction perpendicular to the extending direction, and the outer circumference length decreases as the body 254 is further away from the flat surface 51a.

This configuration ensures that when the coupling member 250, the first plate 70, and the second plate 80 are applied pressure and electrified, the facing portion 72 of the first plate 70, which is lower in melting point than the coupling member 250 and the second plate 80, is melted and discharged to the farther side of the pilot portion 253 through the plurality of discharge grooves 59.

Melting and discharging the facing portion 72 to the farther side of the pilot portion 253 prevents the melted first metal from being left between the flat surface 51a of the coupling member 250 and the first plate 70. Melting and discharging the facing portion 72 to the farther side of the pilot portion 253 also ensures a sufficient level of contact between the pilot portion 253 of the coupling member 250 and the second plate 80. This leads to a sufficient level of coupling between the leading end 255 of the pilot portion 253 and the joint portion 82 of the second plate 80 implemented by resistance welding.

Additionally, the first plate 70 and the second plate 80, which have different melting points, are readily coupled to each other through a single pressure-electrification step.

4. Fourth Embodiment

The fourth embodiment of the present invention will be described. The coupling device 1 according to the first embodiment and a coupling device 301 according to the fourth embodiment are similar to each other in configuration except that the coupling member 50 of the coupling device 1 and a coupling member 350 of the coupling device 301 have different configurations. The following description will focus on those respects in which the coupling member 50 and the coupling member 350 are different from each other.

It is noted that identical reference numerals are used to denote identical or substantially identical components between the coupling devices 1 and 301, and these components have already been described in the first embodiment. To avoid redundancy, these components will not be elaborated upon in the following description.

Figure 21:
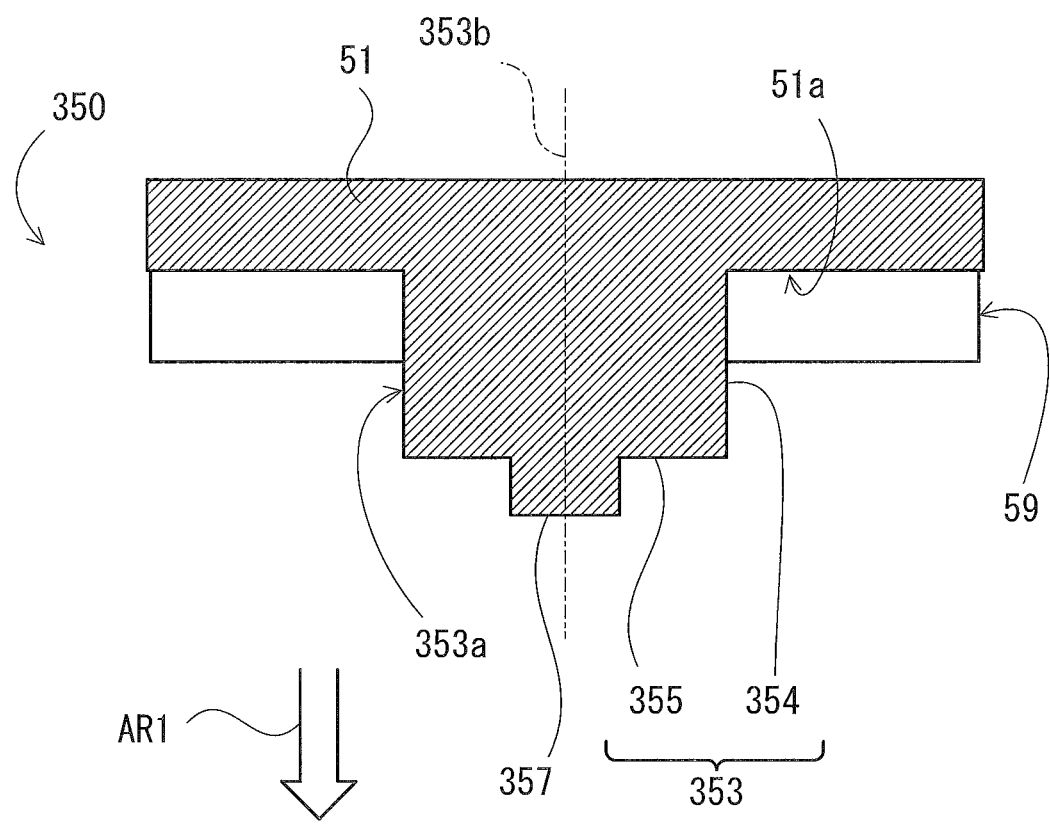
FIG. 21 is a cross-sectional view, taken along the line A-A illustrated in FIG. 3, of the coupling member according to the fourth embodiment of the present invention.
Figure 22:
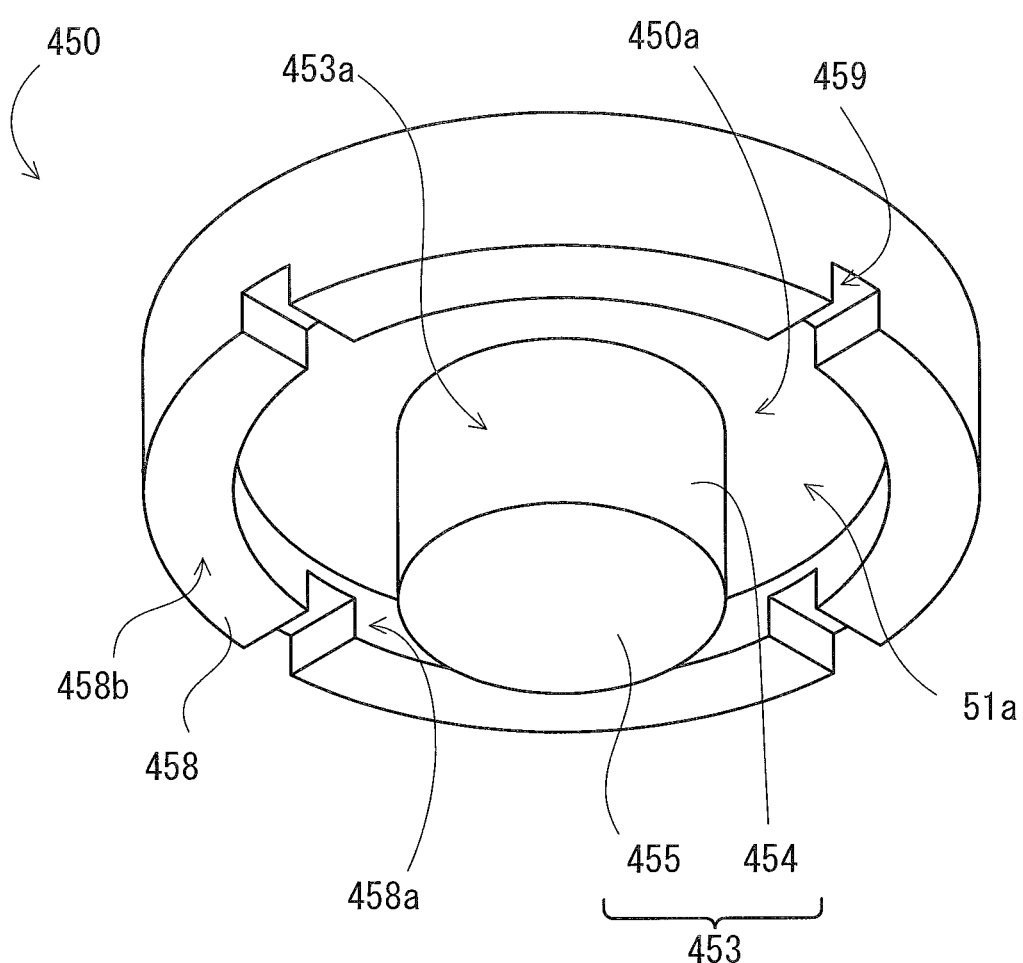
FIG. 22 is a perspective view of a coupling member according to a fifth embodiment of the present invention.
Figure 23:
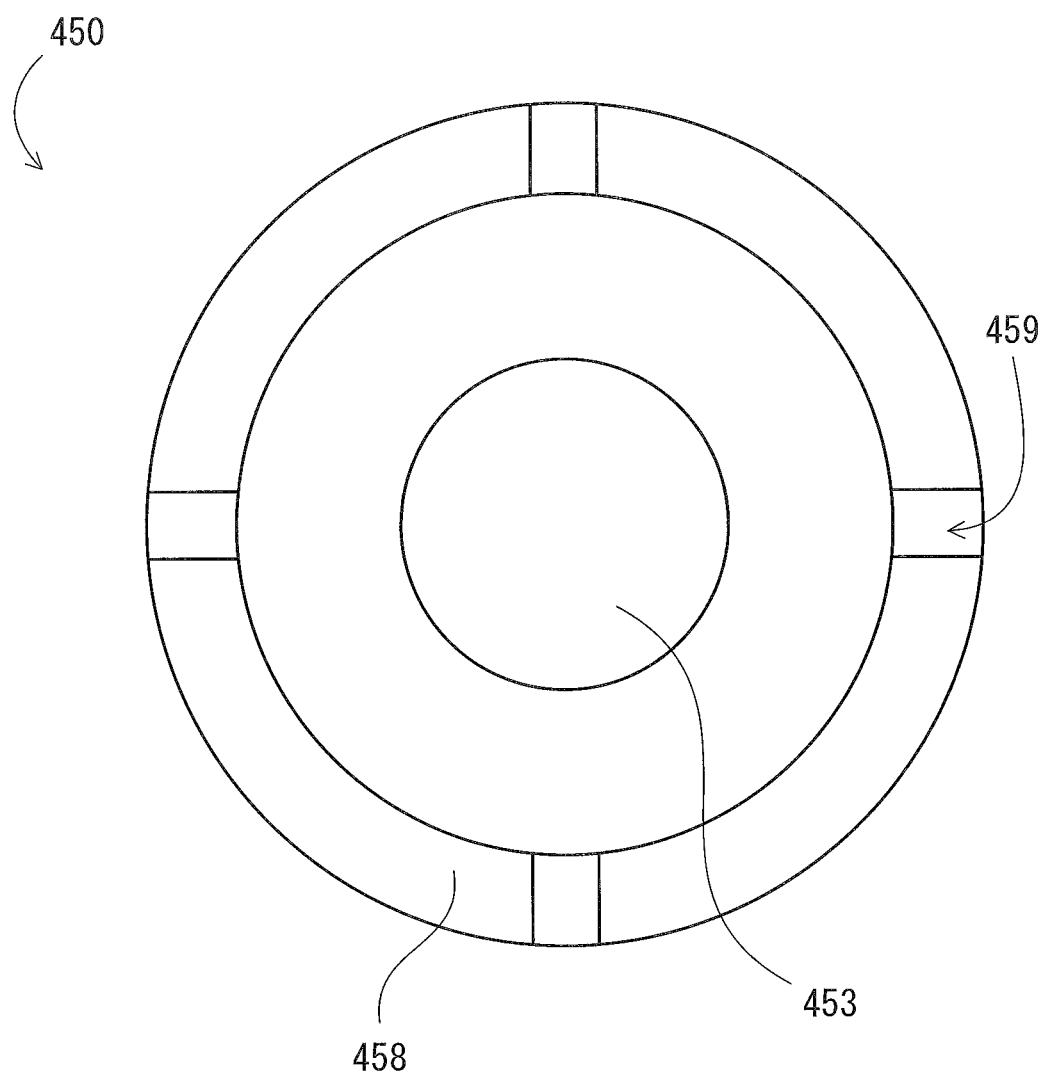
FIG. 23 is a bottom view of the coupling member according to the fifth embodiment of the present invention.
Figure 24:
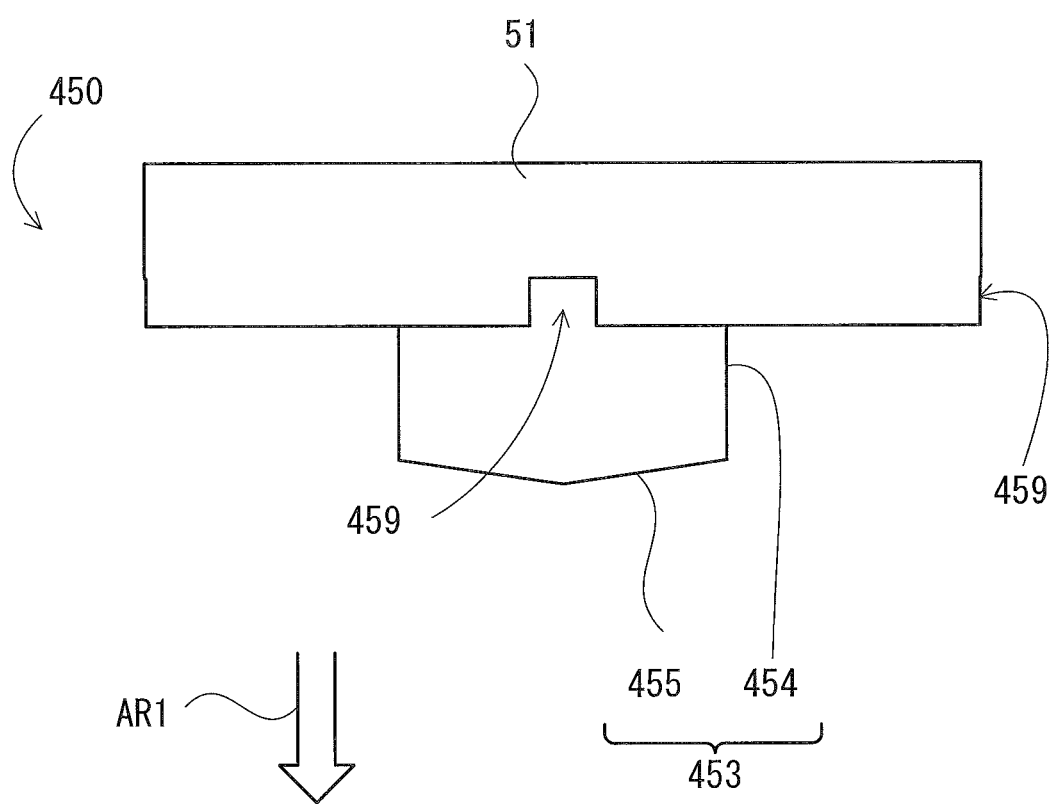
FIG. 24 is a front view of the coupling member according to the fifth embodiment of the present invention.

FIG. 3 and FIGS. 18 to 20 are respectively a plan view, a perspective view, a bottom view, and a front view of the coupling member 350 according to the fourth embodiment. FIG. 21 is a cross-sectional view, taken along the line A-A illustrated in FIG. 3, of the coupling member 350. The coupling member 350 couples (fastens) the first plate 70 and the second plate 80 to each other by resistance welding, similarly to the coupling member 50 according to the first embodiment. As illustrated in FIG. 3 and FIGS. 18 to 21, the coupling member 350 mainly includes the body 51 and a pilot portion 353.

The body 51 is a circular flat plate. The pilot portion 353 is provided approximately at the center of the flat surface 51a of the body 51, and protrudes in the extending direction. Also, on the flat surface 51a, a plurality (four, in the fourth embodiment) of discharge grooves 59 are formed radially extending from the pilot portion 353.

As illustrated in FIG. 21, the pilot portion 353 includes a protrusion 357 on a leading end 355 of the pilot portion 353. The protrusion 357 is provided at or around an axis 353b of the pilot portion 353. A body 354 of the pilot portion 353 has an outer circumference length in the direction perpendicular to the extending direction, and the outer circumference length is approximately uniform throughout an outer circumference surface 353a.

This configuration ensures that when the coupling member 350, the first plate 70, and the second plate 80 are applied pressure and electrified, the facing portion 72 of the first plate 70, which is lower in melting point than the coupling member 350 and the second plate 80, is melted and discharged to the farther side of the pilot portion 353 through the plurality of discharge grooves 59.

Melting and discharging the facing portion 72 to the farther side of the pilot portion 353 prevents the melted first metal from being left between the flat surface 51a of the coupling member 350 and the first plate 70. Melting and discharging the facing portion 72 to the farther side of the pilot portion 353 also ensures a sufficient level of contact between the pilot portion 353 of the coupling member 350 and the second plate 80. This leads to a sufficient level of coupling between the protrusion 357 of the pilot portion 353 and the joint portion 82 of the second plate 80 implemented by resistance welding.

Additionally, the first plate 70 and the second plate 80, which have different melting points, are readily coupled to each other through a single pressure-electrification step.

5. Fifth Embodiment

The fifth embodiment of the present invention will be described. The coupling device 1 according to the first embodiment and a coupling device 401 according to the fifth embodiment are similar to each other in configuration except that the coupling member 50 of the coupling device 1 and a coupling member 450 of the coupling device 401 have different configurations. The following description will focus on those respects in which the coupling member 50 and the coupling member 450 are different from each other.

It is noted that identical reference numerals are used to denote identical or substantially identical components between the coupling devices 1 and 401, and these components have already been described in the first embodiment. To avoid redundancy, these components will not be elaborated upon in the following description.

5.1. Configuration of Coupling Member

Figure 25:
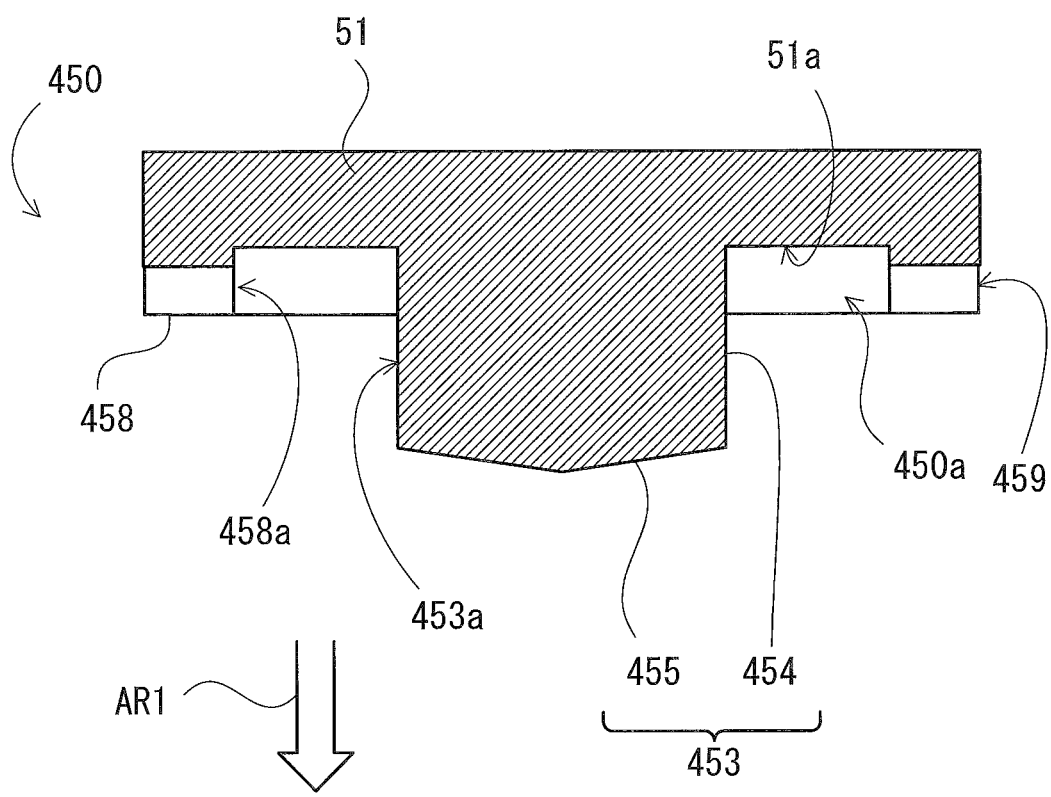
FIG. 25 is a cross-sectional view, taken along the line A-A illustrated in FIG. 3, of the coupling member according to the fifth embodiment of the present invention.

FIG. 3 and FIGS. 22 to 24 are respectively a perspective view, a plan view, a bottom view, and a front view of the coupling member 450 according to the fifth embodiment. FIG. 25 is a cross-sectional view, taken along the line A-A illustrated in FIG. 3, of the coupling member 450. The coupling member 450 couples (fastens) the first plate 70 and the second plate 80 to each other by resistance welding. As illustrated in FIGS. 22 to 25, the coupling member 450 mainly includes the body 51, the pilot portion 453, and a ring-shaped wall 458.

The body 51 is a circular flat plate. The pilot portion 453 is provided approximately at the center of the flat surface 51a of the body 51, and protrudes in the extending direction. The ring-shaped wall 458 is a cylindrical structure provided along the outer circumference of the flat surface 51a. Also, on the ring-shaped end surface 458b of the ring-shaped wall 458, a plurality (four, in the fifth embodiment) of notch-shaped discharge grooves are formed.

As illustrated in FIG. 25, the leading end 455 of the pilot portion 453 has a conical shape. The body 454 of the pilot portion 453 has an outer circumference length in a direction perpendicular to the extending direction, and the outer circumference length is approximately uniform throughout the outer circumference surface 453a.

The ring-shaped wall 458 has an inner circumference length in the direction perpendicular to the extending direction, and the inner circumference length is approximately uniform throughout the inner circumference surface 458a. Also as illustrated in FIG. 25, an inner surface 458a of the ring-shaped wall 458, the flat surface 51a of the body 51, and the outer surface 453a of the pilot portion 453 define a groove space 450a.

5.2. Method of Coupling Using Coupling Member

Figure 26:
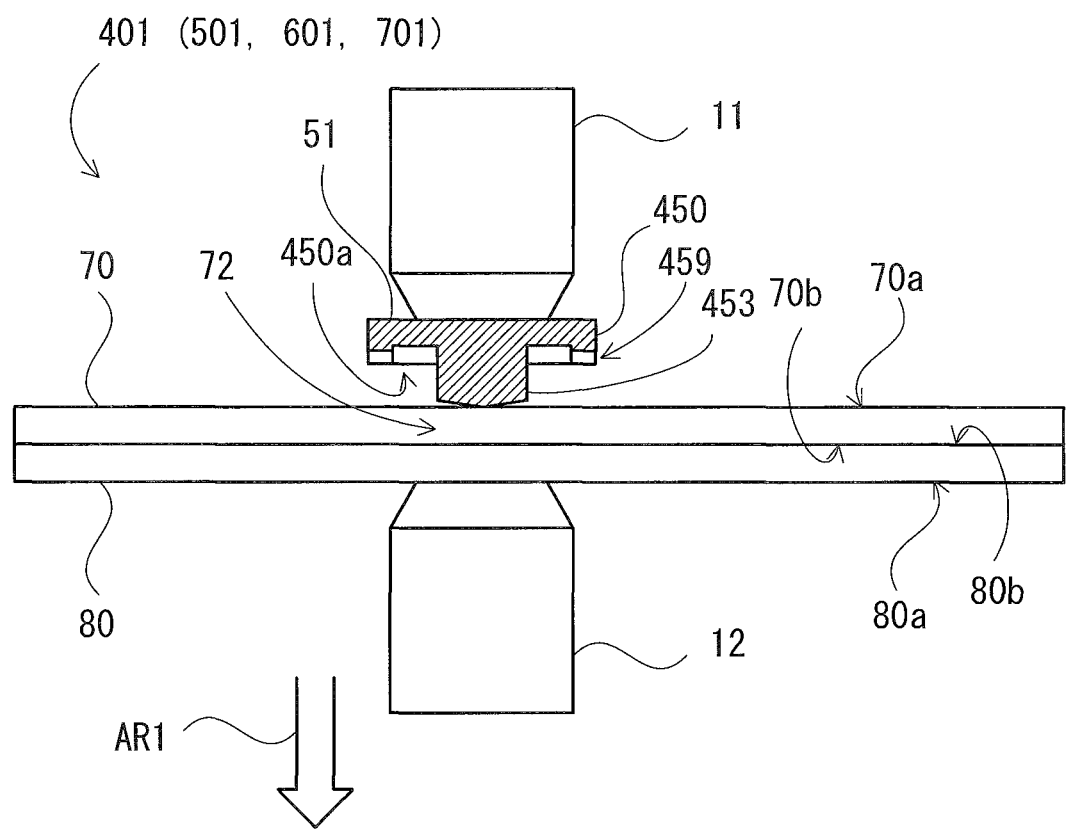
FIG. 26 illustrates a method of coupling using the coupling member according to the fifth to the eighth embodiments of the present invention.
Figure 27:
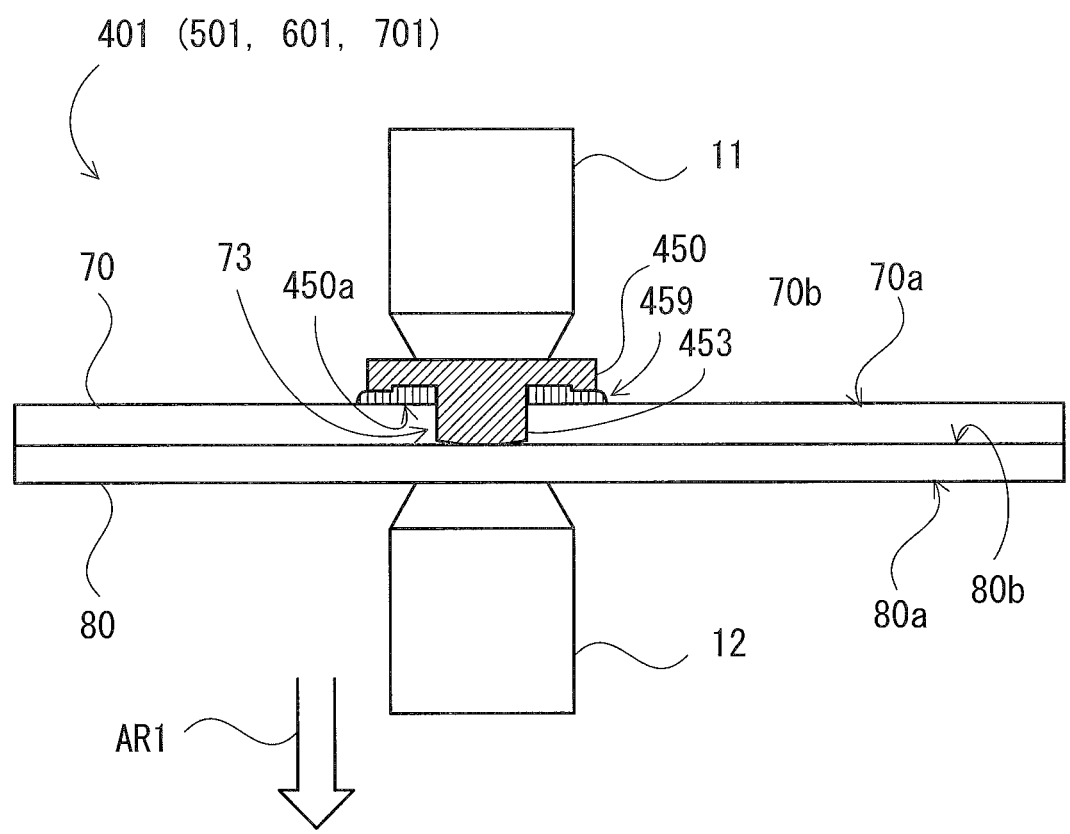
FIG. 27 illustrates a method of coupling using the coupling member according to the fifth to the eighth embodiments of the present invention.
Figure 28:
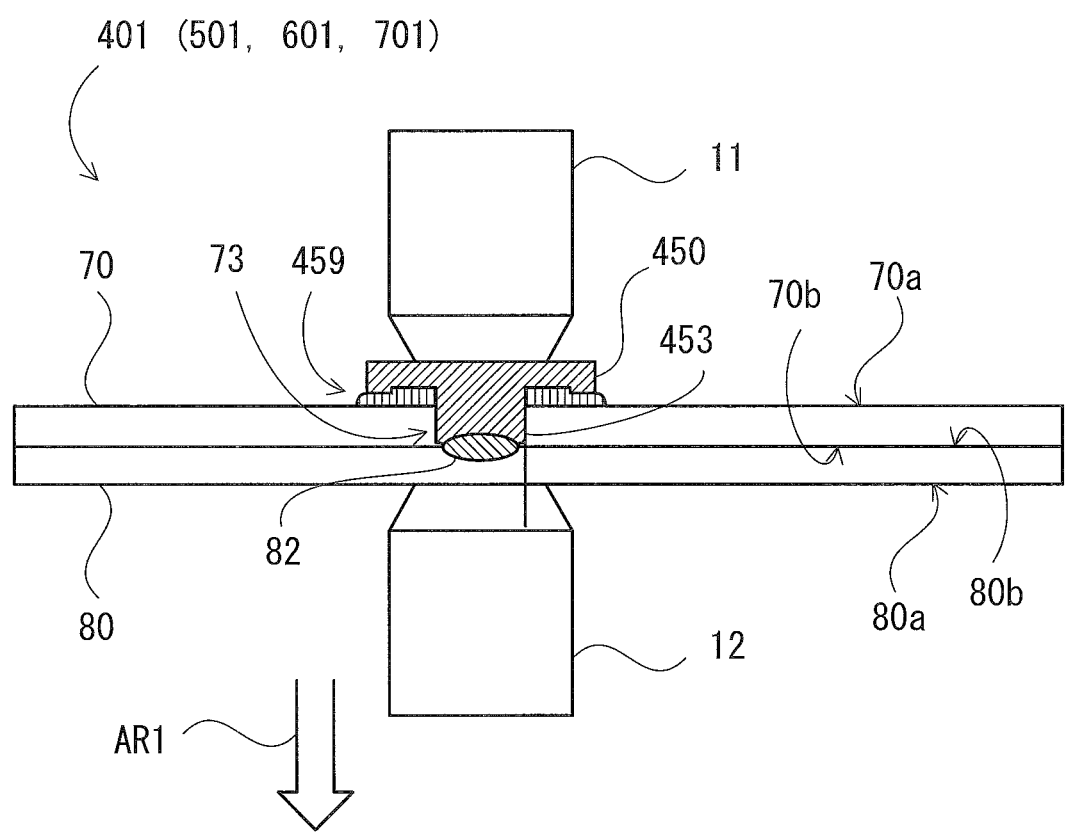
FIG. 28 illustrates a method of coupling using the coupling member according to the fifth to the eighth embodiments of the present invention.
Figure 29:
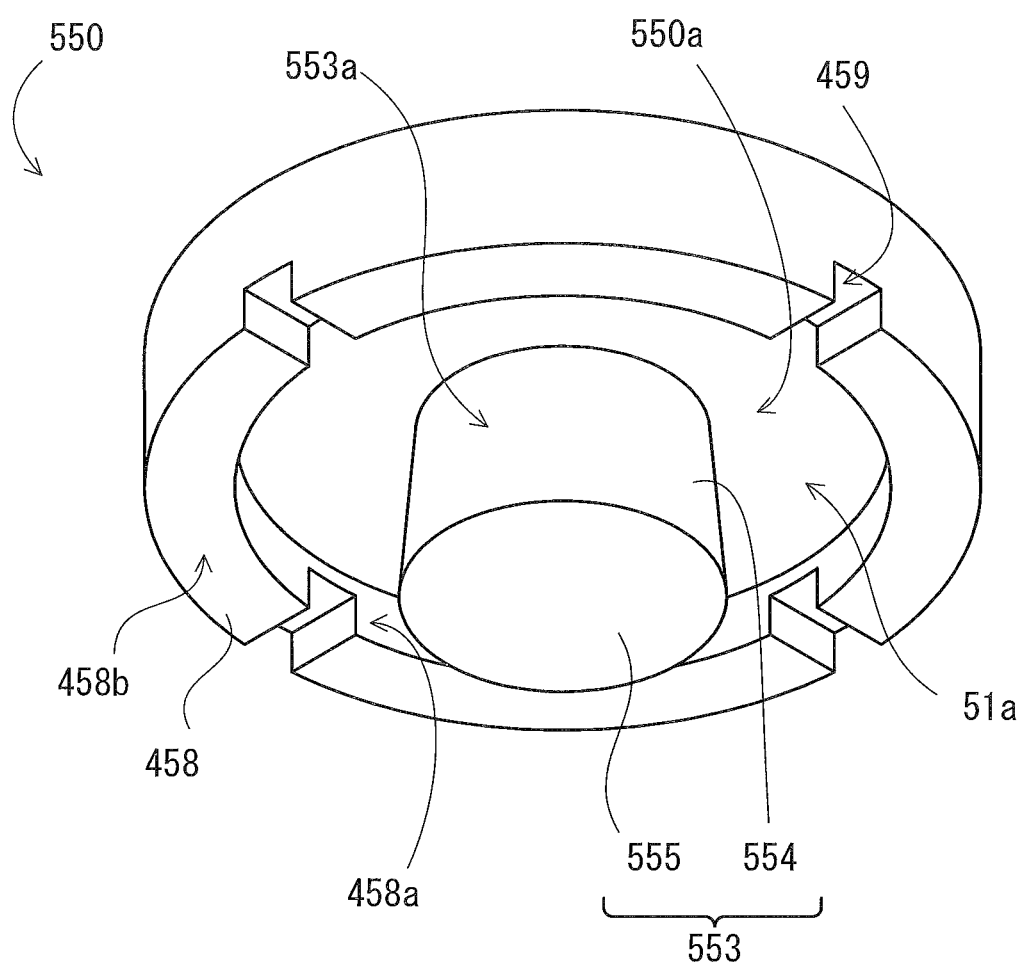
FIG. 29 is a perspective view of a coupling member according to a sixth embodiment of the present invention.
Figure 30:
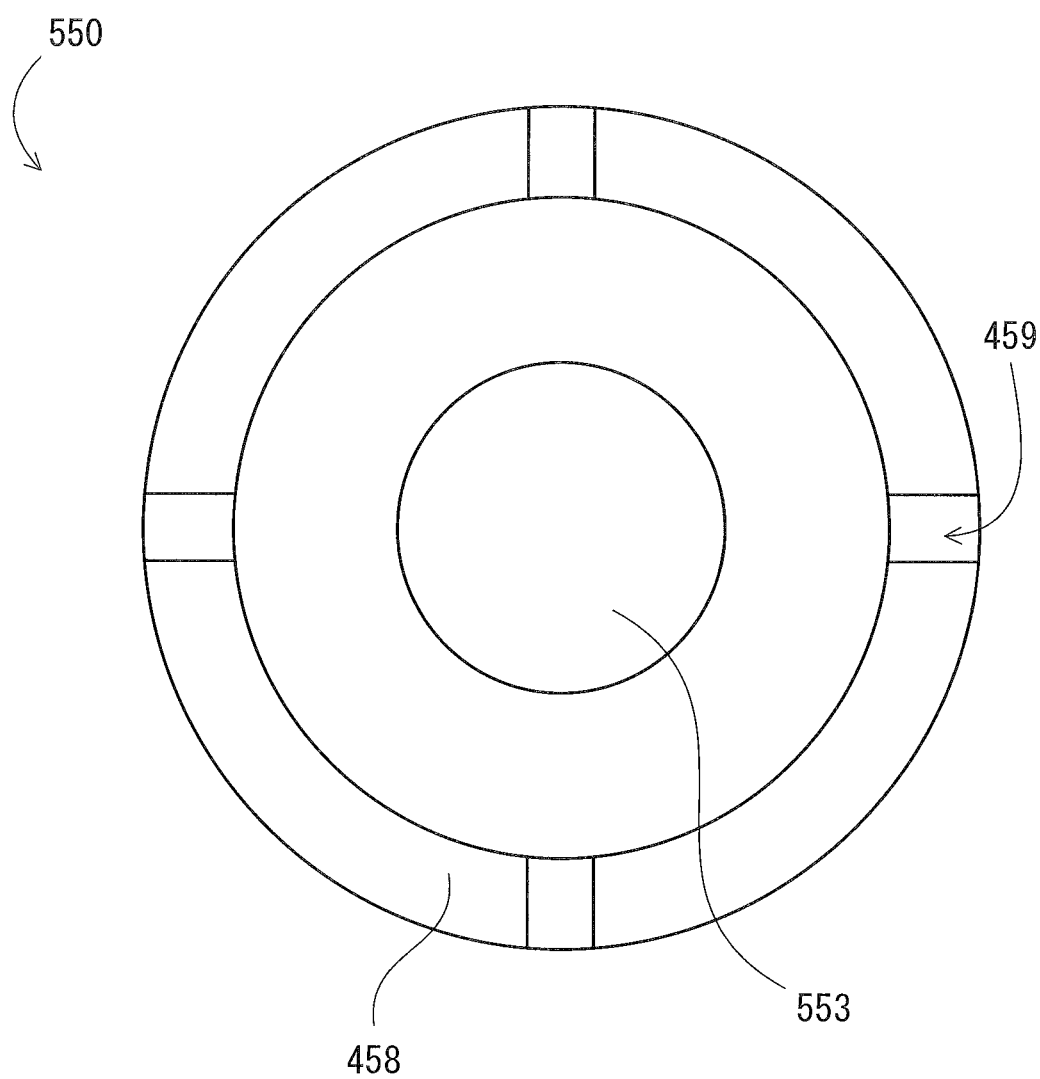
FIG. 30 is a bottom view of the coupling member according to the sixth embodiment of the present invention.
Figure 31:
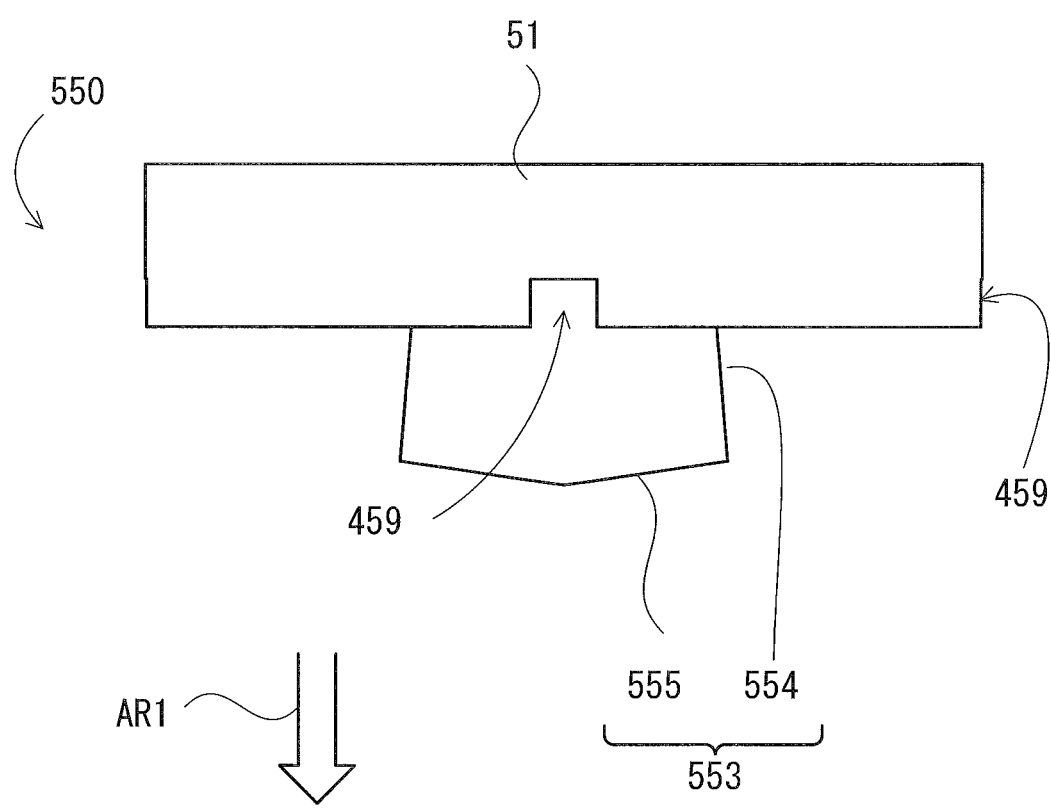
FIG. 31 is a front view of the coupling member according to the sixth embodiment of the present invention.

FIGS. 26 to 28 illustrate a method of coupling using the coupling member 450. In this method of coupling, first, the electrode 11 is moved to a position at the side of the coupling member 450, and the electrode 12 is moved to a position at the side of the second plate 80. This causes the coupling member 450, the first plate 70, and the second plate 80 to held between the electrodes 11 and 12.

This results in the contact state illustrated in FIG. 26. Specifically:

(1) the leading end of the electrode 11 and the body 51 of the coupling member 450 are in contact with each other;

(2) the pilot portion 453 of the coupling member 450 and a first main surface 70a of the first plate 70 are in contact with each other;

(3) a second main surface 70b of the first plate 70 and a first main surface 80a of the second plate 80 are in contact with each other, and (4) a second main surface 80b of the second plate 80 and the leading end of the electrode 12 are in contact with each other.

Then, with the contact state (1) to (4) maintained, the controller 40 controls the power source 20 to electrify the coupling member 450, the first plate 70, and the second plate 80 while controlling the driver 30 to apply pressure to the coupling member 450, the first plate 70, and the second plate 80.

This causes a facing portion 72 (see FIG. 26) of the first plate 70, which faces the pilot portion 453 of the coupling member 450, to be melted, resulting in a through hole 73 (see FIG. 27) formed at a position corresponding to the facing portion 72. Also, the melted first metal of the facing portion 72 is moved into the groove space 450a of the coupling member 450. Then, occasionally, part of the melted metal discharged into the groove space 450a of the coupling member 450 is discharged to the farther side of the pilot portion 453 through a plurality of discharge grooves 459 formed on the ring-shaped end surface 458b (see vertical hatching illustrated in FIG. 27).

As a result of the melting of the facing portion 72, the leading end 455 of the pilot portion 453 and a joint portion 82 (see FIG. 28) of the second plate 80 come into contact with each other. Then, the leading end 455 and the joint portion 82 are melted and solidified by resistance welding, and thus are coupled to each other.

5.3. Advantages of Coupling Device According to Fifth Embodiment

As has been described hereinbefore, in the coupling member 450 according to the fifth embodiment, on the ring-shaped end surface 458b of the ring-shaped wall 458, the plurality of notch-shaped discharge grooves are formed. Also, an inner surface 458a of the ring-shaped wall 458, the flat surface 51a of the body 51, and the outer surface 453a of the pilot portion 453 define a groove space 450a.

Additionally, this configuration ensures that when the coupling member 450, the first plate 70, and the second plate 80 are applied pressure and electrified, the facing portion 72 of the first plate 70, which is lower in melting point than the coupling member 450 and the second plate 80, is melted and discharged into the groove space 450a of the coupling member 450. Also, occasionally, part of the melted metal discharged into the groove space 450a of the coupling member 450 is discharged to the farther side of the pilot portion 453 through the plurality of ring-shaped walls 458 formed on the ring-shaped end surface 458b.

This prevents the melted first metal from being left between the ring-shaped wall 458 of the coupling member 450 and the first plate 70. This, in turn, prevents the coupling member 450 from being removed from the first plate 70, and eliminates or minimizes insufficient contact between the ring-shaped end surface 458b of the ring-shaped wall 458 and the first plate 70.

This also ensures a sufficient level of contact between the pilot portion 453 of the coupling member 450 and the second plate 80. This leads to a sufficient level of coupling between the leading end 455 of the pilot portion 453 and the joint portion 82 of the second plate 80 implemented by resistance welding.

Additionally, the first plate 70 and the second plate 80, which have different melting points, are readily coupled to each other through a single pressure-electrification step.

6. Sixth Embodiment

The sixth embodiment of the present invention will be described. The coupling device 1 according to the first embodiment and a coupling device 501 according to the sixth embodiment are similar to each other in configuration except that the coupling member 50 of the coupling device 1 and a coupling member 550 of the coupling device 501 have different configurations. The following description will focus on those respects in which the coupling member 50 and the coupling member 550 are different from each other.

It is noted that identical reference numerals are used to denote identical or substantially identical components between the coupling devices 1 and 501, and these components have already been described in the first embodiment. To avoid redundancy, these components will not be elaborated upon in the following description.

Figure 32:
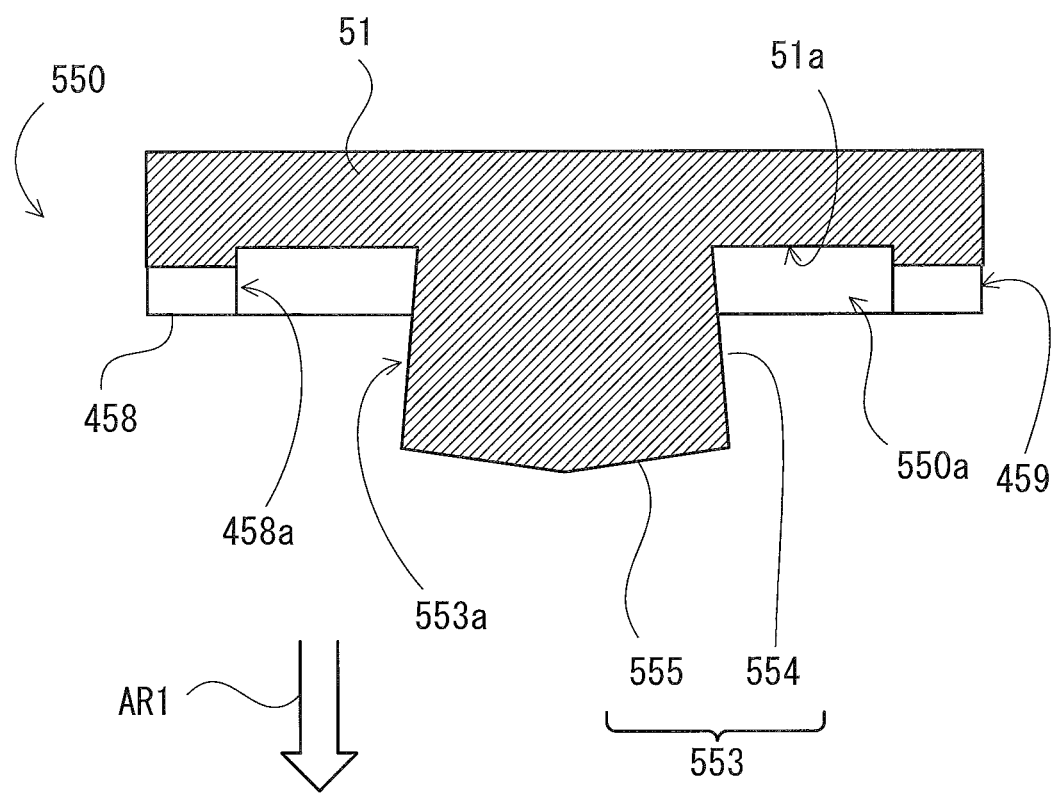
FIG. 32 is a cross-sectional view, taken along the line A-A illustrated in FIG. 3, of the coupling member according to the sixth embodiment of the present invention.
Figure 33:
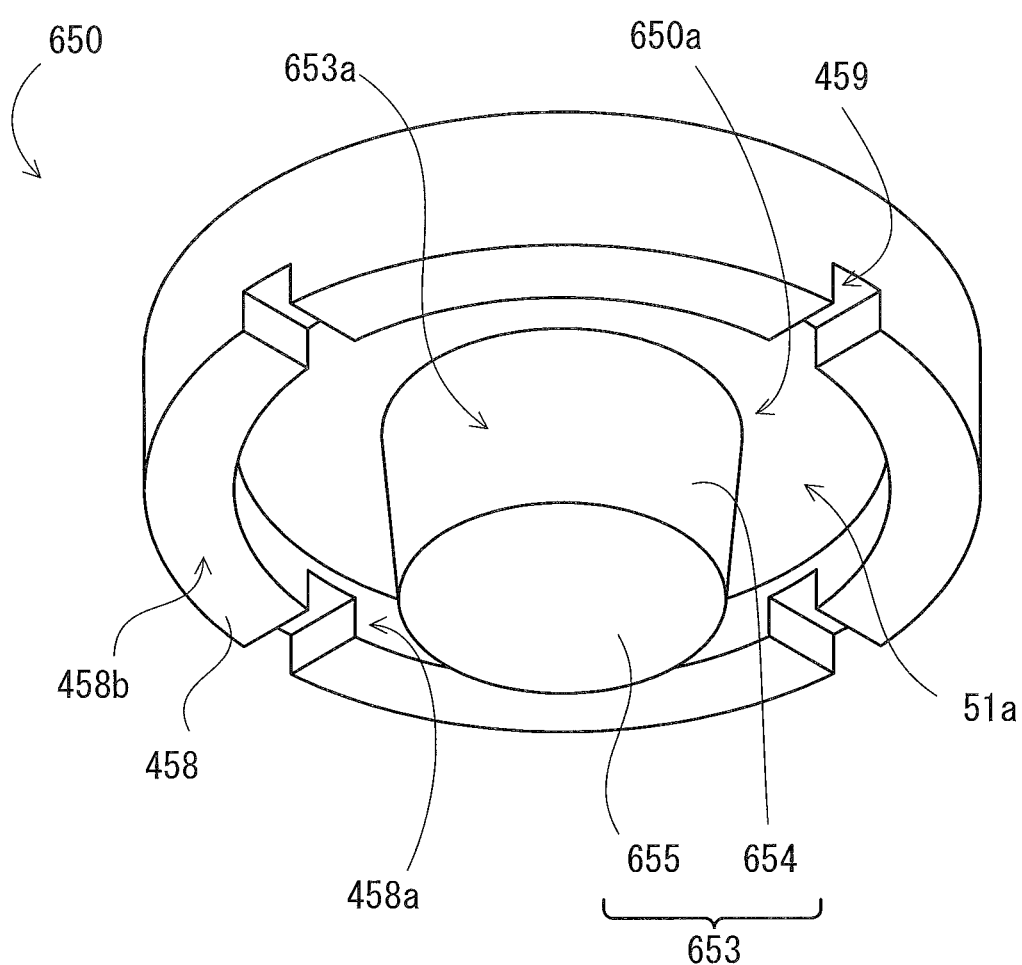
FIG. 33 is a perspective view of a coupling member according to a seventh embodiment of the present invention.
Figure 34:
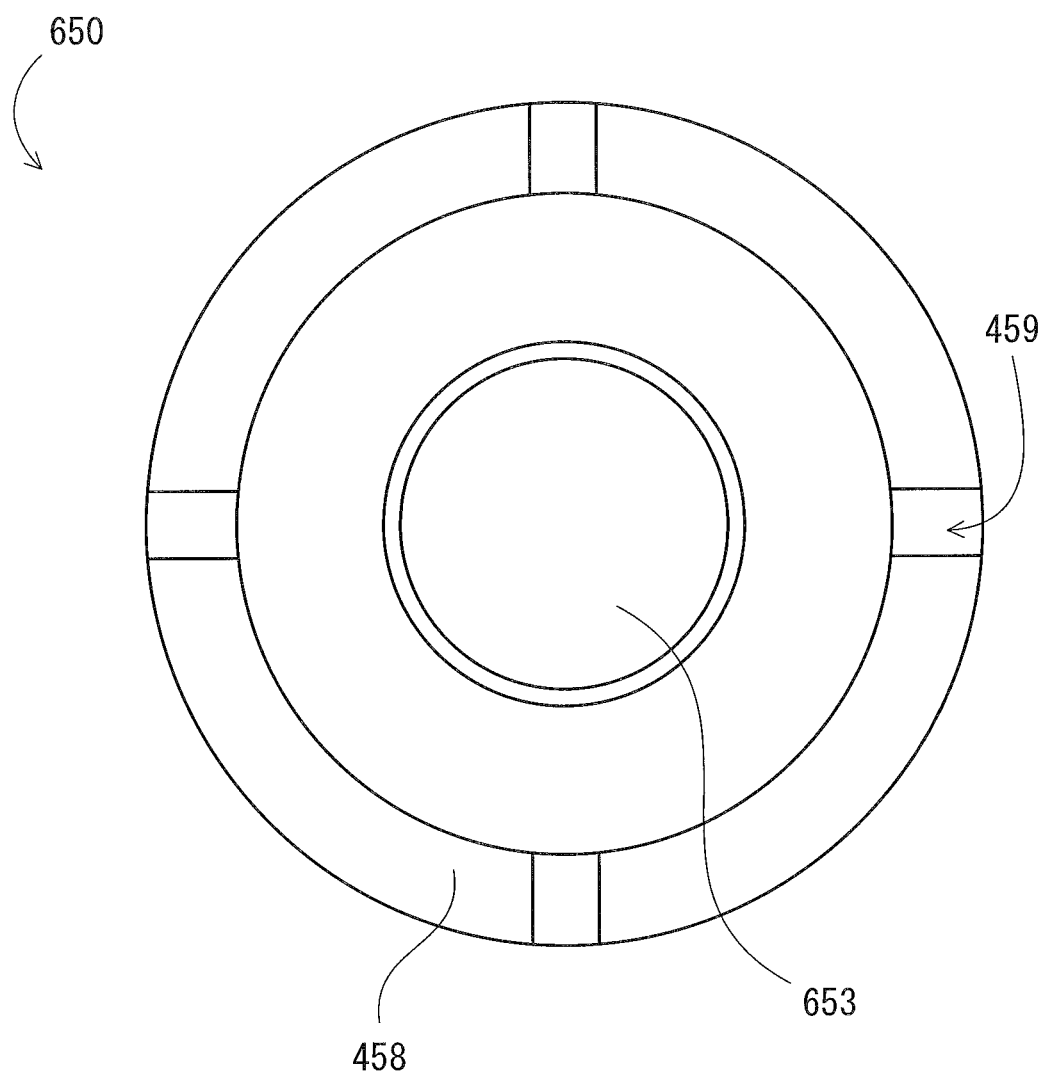
FIG. 34 is a bottom view of the coupling member according to the seventh embodiment of the present invention.
Figure 35:
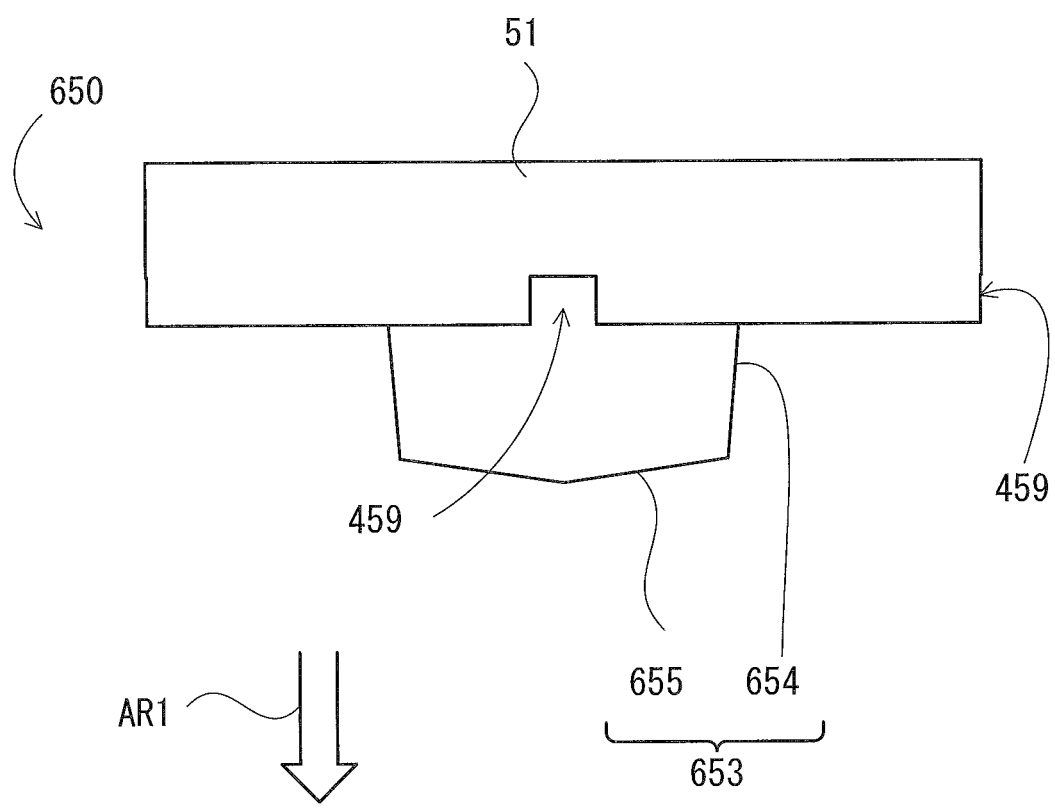
FIG. 35 is a front view of the coupling member according to the seventh embodiment of the present invention.

FIG. 3 and FIGS. 29 to 31 are respectively a plan view, a perspective view, a bottom view, and a front view of the coupling member 550 according to the sixth embodiment. FIG. 32 is a cross-sectional view, taken along the line A-A illustrated in FIG. 3, of the coupling member 550. The coupling member 550 couples (fastens) the first plate 70 and the second plate 80 to each other by resistance welding, similarly to the coupling member 50 according to the first embodiment. As illustrated in FIG. 3 and FIGS. 29 to 32, the coupling member 550 mainly includes the body 51 and a pilot portion 553.

The body 51 is a circular flat plate. The pilot portion 553 is provided approximately at the center of the flat surface 51a of the body 51, and protrudes in the extending direction. The ring-shaped wall 458 is a cylindrical structure provided along the outer circumference of the flat surface 51a. Also, on the ring-shaped end surface 458b of the ring-shaped wall 458, a plurality (four, in the sixth embodiment) of notch-shaped discharge grooves are formed.

As illustrated in FIG. 32, a leading end 555 of the pilot portion 553 has a conical shape. A body 554 of the pilot portion 553 has an outer circumference length in the direction perpendicular to the extending direction, and the outer circumference length increases as the body 554 is further away from the flat surface 51a.

The ring-shaped wall 458 has an inner circumference length in the direction perpendicular to the extending direction, and the inner circumference length is approximately uniform throughout the inner circumference surface 458a. Also as illustrated in FIG. 32, the inner surface 458a of the ring-shaped wall 458, the flat surface 51a of the body 51, and an outer surface 553a of the pilot portion 553 define a groove space 550a.

This configuration ensures that when the coupling member 550, the first plate 70, and the second plate 80 are applied pressure and electrified, the facing portion 72 of the first plate 70, which is lower in melting point than the coupling member 550 and the second plate 80, is melted and discharged into the groove space 550a of the coupling member 550. Then, occasionally, part of the melted metal discharged into the groove space 550a of the coupling member 550 is discharged to the farther side of the pilot portion 553 through the plurality of discharge grooves 459 formed on the ring-shaped end surface 458b.

This prevents the melted first metal from being left between the ring-shaped wall 458 of the coupling member 550 and the first plate 70. Melting and discharging the facing portion 72 to the farther side of the pilot portion 553 also ensures a sufficient level of contact between the pilot portion 553 of the coupling member 550 and the second plate 80. This leads to a sufficient level of coupling between the leading end 555 of the pilot portion 553 and the joint portion 82 of the second plate 80 implemented by resistance welding.

Additionally, the first plate 70 and the second plate 80, which have different melting points, are readily coupled to each other through a single pressure-electrification step.

7. Seventh Embodiment

The seventh embodiment of the present invention will be described. The coupling device 1 according to the first embodiment and a coupling device 601 according to the seventh embodiment are similar to each other in configuration except that the coupling member 50 of the coupling device 1 and a coupling member 650 of the coupling device 601 have different configurations. The following description will focus on those respects in which the coupling member 50 and the coupling member 650 are different from each other.

It is noted that identical reference numerals are used to denote identical or substantially identical components between the coupling devices 1 and 601, and these components have already been described in the first embodiment. To avoid redundancy, these components will not be elaborated upon in the following description.

Figure 36:
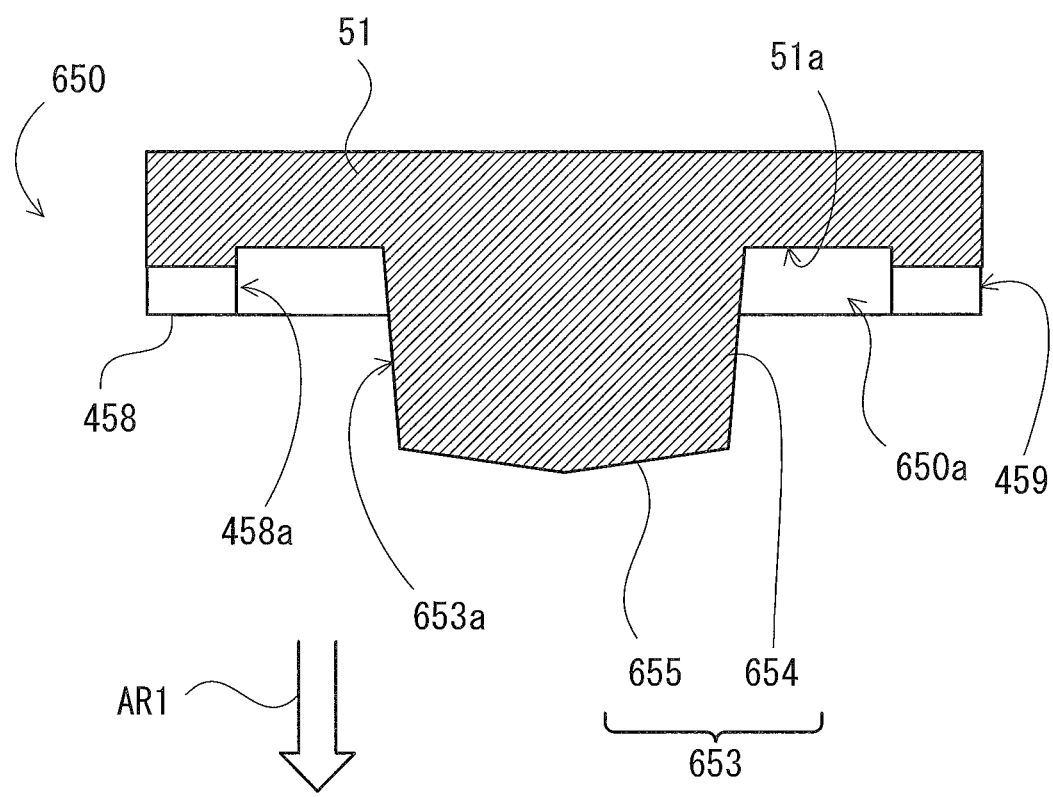
FIG. 36 is a cross-sectional view, taken along the line A-A illustrated in FIG. 3, of the coupling member according to the seventh embodiment of the present invention.
Figure 37:
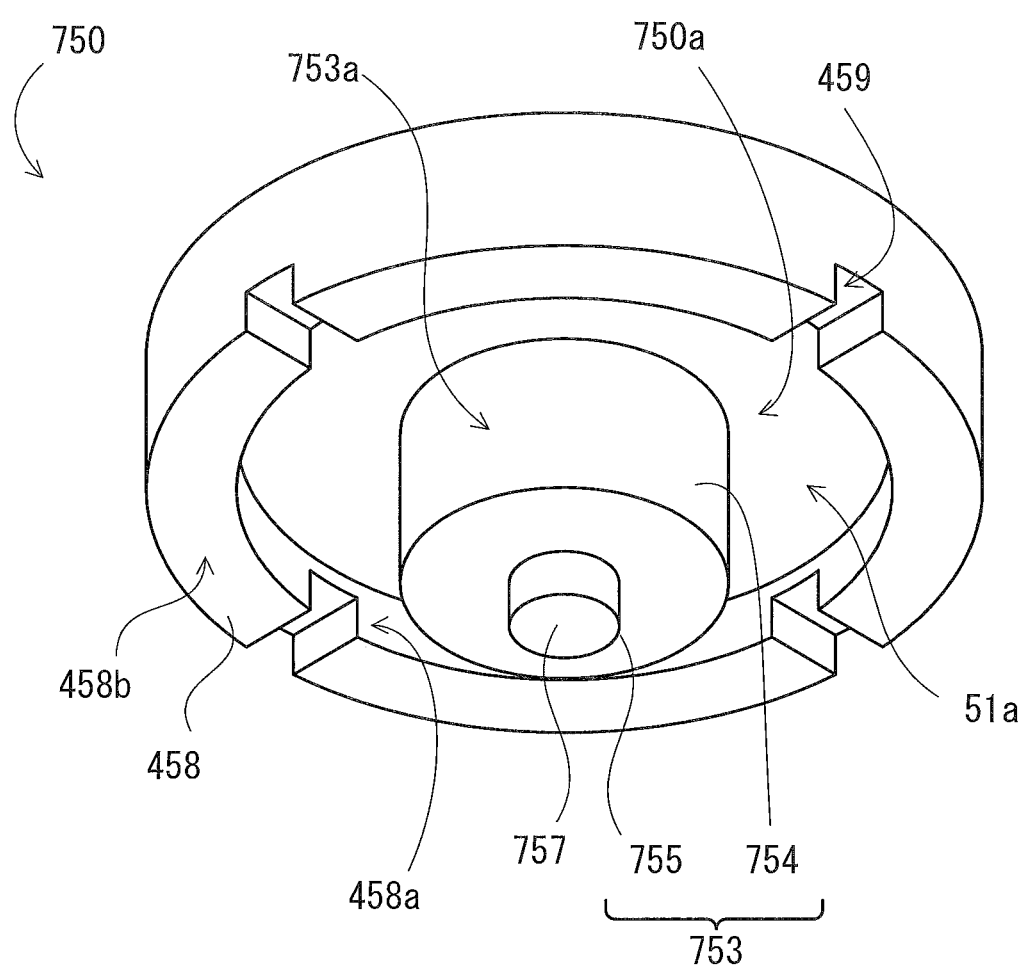
FIG. 37 is a perspective view of a coupling member according to an eighth embodiment of the present invention.
Figure 38:
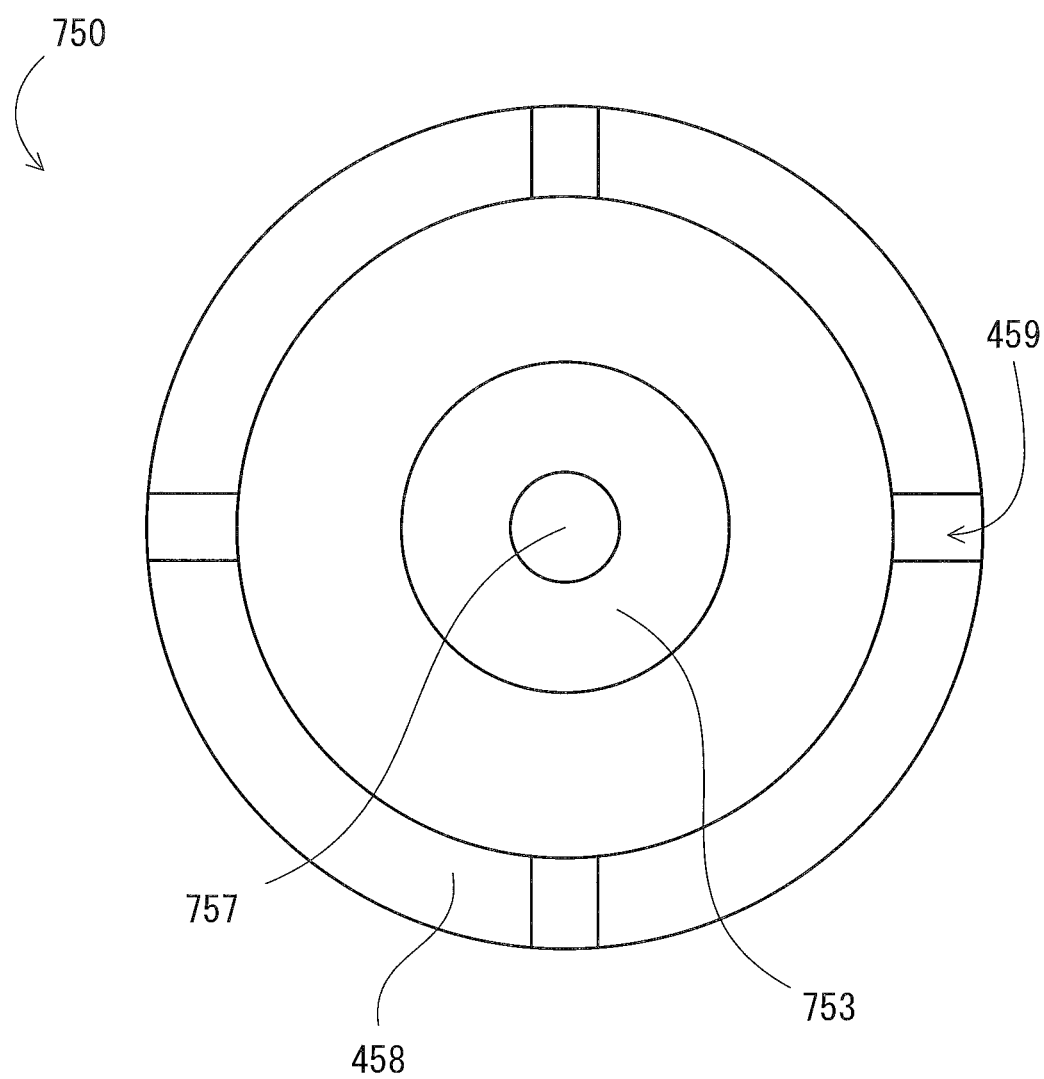
FIG. 38 is a bottom view of the coupling member according to the eighth embodiment of the present invention.
Figure 39:
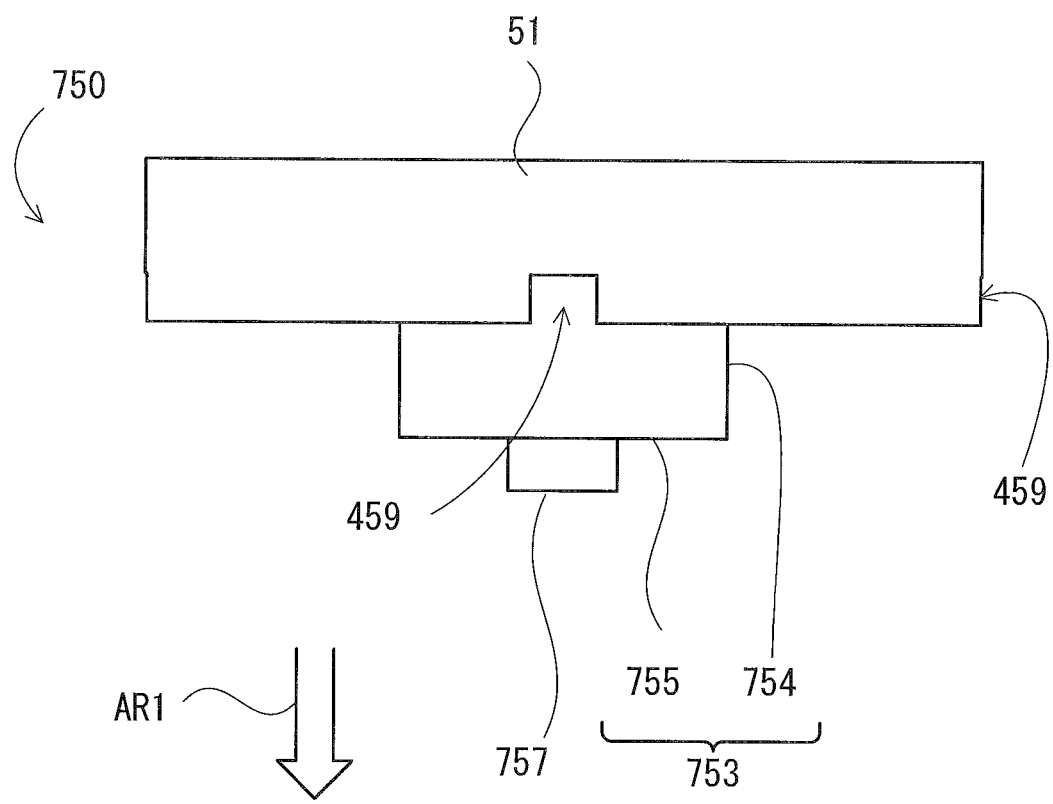
FIG. 39 is a front view of the coupling member according to the eighth embodiment of the present invention.

FIG. 3 and FIGS. 33 to 35 are respectively a plan view, a perspective view, a bottom view, and a front view of the coupling member 650 according to the seventh embodiment. FIG. 36 is a cross-sectional view, taken along the line A-A illustrated in FIG. 3, of the coupling member 650. The coupling member 650 couples (fastens) the first plate 70 and the second plate 80 to each other by resistance welding, similarly to the coupling member 50 according to the first embodiment. As illustrated in FIG. 3 and FIGS. 33 to 36, the coupling member 650 mainly includes the body 51 and a pilot portion 653.

The body 51 is a circular flat plate. The pilot portion 653 is provided approximately at the center of the flat surface 51a of the body 51, and protrudes in the extending direction. The ring-shaped wall 458 is a cylindrical structure provided along the outer circumference of the flat surface 51a. Also, on the ring-shaped end surface 458b of the ring-shaped wall 458, a plurality (four, in the seventh embodiment) of notch-shaped discharge grooves are formed.

As illustrated in FIG. 36, a leading end 655 of the pilot portion 653 has a conical shape. A body 654 of the pilot portion 653 has an outer circumference length in the direction perpendicular to the extending direction, and the outer circumference length decreases as the body 654 is further away from the flat surface 51a.

The ring-shaped wall 458 has an inner circumference length in the direction perpendicular to the extending direction, and the inner circumference length is approximately uniform throughout the inner circumference surface 458a. Also as illustrated in FIG. 36, an inner surface 458a of the ring-shaped wall 458, the flat surface 51a of the body 51, and an outer surface 653a of the pilot portion 653 define a groove space 650a.

This configuration ensures that when the coupling member 650, the first plate 70, and the second plate 80 are applied pressure and electrified, the facing portion 72 of the first plate 70, which is lower in melting point than the coupling member 650 and the second plate 80, is melted and discharged into the groove space 650a of the coupling member 650. Then, occasionally, part of the melted metal discharged into the groove space 650a of the coupling member 650 is discharged to the farther side of the pilot portion 653 through the plurality of discharge grooves 459 formed on the ring-shaped end surface 458b.

This prevents the melted first metal from being left between the ring-shaped wall 458 of the coupling member 650 and the first plate 70. Melting and discharging the facing portion 72 into the groove space 650a and to the farther side of the pilot portion 653 also ensures a sufficient level of contact between the pilot portion 653 of the coupling member 650 and the second plate 80. This leads to a sufficient level of coupling between the leading end 655 of the pilot portion 653 and the joint portion 82 of the second plate 80 implemented by resistance welding.

Additionally, the first plate 70 and the second plate 80, which have different melting points, are readily coupled to each other through a single pressure-electrification step.

8. Eighth Embodiment

The eighth embodiment of the present invention will be described. The coupling device 1 according to the first embodiment and a coupling device 701 according to the eighth embodiment are similar to each other in configuration except that the coupling member 50 of the coupling device 1 and a coupling member 750 of the coupling device 701 have different configurations. The following description will focus on those respects in which the coupling member 50 and the coupling member 750 are different from each other.

It is noted that identical reference numerals are used to denote identical or substantially identical components between the coupling devices 1 and 701, and these components have already been described in the first embodiment. To avoid redundancy, these components will not be elaborated upon in the following description.

Figure 40:
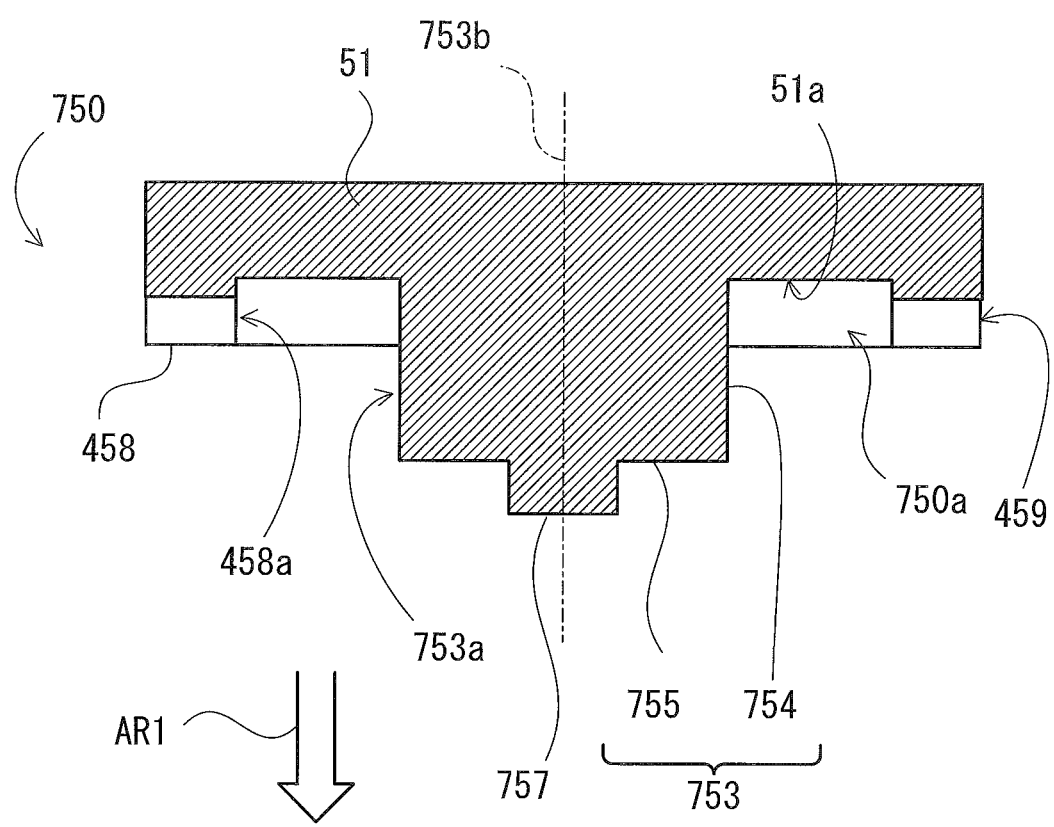
FIG. 40 is a cross-sectional view, taken along the line A-A illustrated in FIG. 3, of the coupling member according to the eighth embodiment of the present invention.

FIG. 3 and FIGS. 37 to 39 are respectively a plan view, a perspective view, a bottom view, and a front view of the coupling member 750 according to the eighth embodiment. FIG. 40 is a cross-sectional view, taken along the line A-A illustrated in FIG. 3, of the coupling member 750. The coupling member 750 couples (fastens) the first plate 70 and the second plate 80 to each other by resistance welding, similarly to the coupling member 50 according to the first embodiment. As illustrated in FIG. 3 and FIGS. 37 to 40, the coupling member 750 mainly includes the body 51 and a pilot portion 753.

The body 51 is a circular flat plate. The pilot portion 753 is provided approximately at the center of the flat surface 51a of the body 51, and protrudes in the extending direction. The ring-shaped wall 458 is a cylindrical structure provided along the outer circumference of the flat surface 51a. Also, on the ring-shaped end surface 458b of the ring-shaped wall 458, a plurality (four, in the eighth embodiment) of notch-shaped discharge grooves are formed.

As illustrated in FIG. 40, the pilot portion 753 includes a protrusion 757 on a leading end 755 of the pilot portion 753. The protrusion 757 is provided at or around an axis 753b of the pilot portion 753. A body 754 of the pilot portion 753 has an outer circumference length in the direction perpendicular to the extending direction, and the outer circumference length is approximately uniform throughout an outer circumference surface 753a.

The ring-shaped wall 458 has an inner circumference length in the direction perpendicular to the extending direction, and the inner circumference length is approximately uniform throughout the inner circumference surface 458a. Also as illustrated in FIG. 40, the inner surface 458a of the ring-shaped wall 458, the flat surface 51a of the body 51, and an outer surface 753a of the pilot portion 753 define a groove space 750a.

This configuration ensures that when the coupling member 750, the first plate 70, and the second plate 80 are applied pressure and electrified, the facing portion 72 of the first plate 70, which is lower in melting point than the coupling member 750 and the second plate 80, is melted and discharged into the groove space 750a of the coupling member 750. Then, occasionally, part of the melted metal discharged into the groove space 750a of the coupling member 750 is discharged to the farther side of the pilot portion 753 through the plurality of discharge grooves 459 formed on the ring-shaped end surface 458b.

This prevents the melted first metal from being left between the ring-shaped wall 458 of the coupling member 750 and the first plate 70. Melting and discharging the facing portion 72 into the groove space 750a and to the farther side of the pilot portion 753 also ensures a sufficient level of contact between the pilot portion 753 of the coupling member 750 and the second plate 80. This leads to a sufficient level of coupling between the protrusion 757 of the pilot portion 753 and the joint portion 82 of the second plate 80 implemented by resistance welding.

Additionally, the first plate 70 and the second plate 80, which have different melting points, are readily coupled to each other through a single pressure-electrification step.

9. Modifications

Possible modifications of the above-described embodiments will be described.

(1) In the first to fourth embodiments of the present invention, four discharge grooves 59 are formed on the flat surface 51a. This configuration, however, is not intended in a limiting sense. In a possible modification, the number of the discharge grooves 59 is two, three, five or more. In another possible modification, the number of the discharge grooves is two or more.

(2) Also, in the fifth to eighth embodiments of the present invention, four discharge grooves 59 are formed on the ring-shaped end surface 458b of the ring-shaped wall 458. This configuration, however, is not intended in a limiting sense. In a possible modification, the number of the discharge grooves 459 is two, three, five or more. In another possible modification, the number of the discharge grooves 459 is two or more.

(3) Also, in the fourth and eighth embodiments of the present invention, the body of the pilot portion has an outer circumference length in the direction perpendicular to the extending direction, and the outer circumference length is approximately uniform throughout the outer circumference surface. This configuration, however, is not intended in a limiting sense.

In a possible modification, the outer circumference length of the body of the pilot portion in the direction perpendicular to the extending direction increases or decreases as the body is further away from the flat surface 51a.

(4) Also, in the fifth and eighth embodiments of the present invention, the inner circumference length of the ring-shaped wall 458 in the direction perpendicular to the extending direction, and the inner circumference length is approximately uniform throughout the inner circumference surface 458a. This configuration, however, is not intended in a limiting sense.

In a possible modification, the inner circumference length of the ring-shaped wall 458 in the direction perpendicular to the extending direction increases or decreases as the body is further away from the flat surface 51a.

(5) Also, in the first to eighth embodiments of the present invention, the driver 30 moves the electrodes 11 and 12 in the vertical directions relative to the coupling member 50, the first plate 70, and the second plate 80. This, however, is not intended as limiting how to move the electrodes 11 and 12.

In a possible modification, the electrode 11 is fixed and the electrode 12 is movable in the vertical directions. In another possible modification, the electrode 12 is fixed and the electrode 11 is movable in the vertical directions. Thus, such a configuration suffices that at least one of the electrodes 11 and 12 is movable relative to the other electrode.

Obviously, numerous modifications and variations of the present invention are possible in light of the above teachings. It is therefore to be understood that within the scope of the appended claims, the present invention may be practiced otherwise than as specifically described herein.

What is claimed is:

1. A coupling device configured to, using a coupling member, couple a first plate made of a first metal and a second plate made of a second metal to each other, the coupling device comprising:
    (a) a first electrode and a second electrode;
    (b) a power source connected to the first electrode and the second electrode;
    (c) a driver configured to move the first electrode and the second electrode relative to the coupling member, the first plate, and the second plate; and
    (d) a controller configured to control the power source and the driver to electrify the coupling member, the first plate, and the second plate while controlling the first electrode and the second electrode to apply pressure to the coupling member, the first plate, and the second plate,
    wherein the coupling member is made of a third metal approximately identical to the second metal,
    wherein the first metal has a melting point lower than a melting point of the second metal and a melting point of the third metal,
    wherein the coupling member comprises
        a body, and
        a pilot portion provided approximately at a center of a flat surface of the body and protruding in an extending direction,
    wherein, on the flat surface, a plurality of discharge grooves are formed radially extending from the pilot portion,
    wherein the pilot portion is solid,
    wherein the controller is configured to make the coupling member, the first plate, and the second plate held between the first electrode and the second electrode so as to make a contact state between:
        a leading end of the first electrode and the body of the coupling member;
        the pilot portion of the coupling member and a first main surface of the first plate;
        a second main surface of the first plate and a first main surface of the second plate; and
        a second main surface of the second plate and a leading end of the second electrode, and
    wherein the controller is configured to, while maintaining the contact state, control the power source to electrify the coupling member, the first plate, and the second plate while controlling the driver to apply pressure to the coupling member, the first plate, and the second plate so as to:
        (i) melt a facing portion of the first plate facing the pilot portion of the coupling member, and discharge the melted facing portion to a farther side of the pilot portion through the plurality of discharge grooves formed on the coupling member, whereby the facing portion is removed, allowing a leading end of the pilot portion and a joint portion of the second plate to contact each other; and
        (ii) melt and solidify the leading end of the pilot portion and the joint portion of the second plate to couple the leading end of the pilot portion and the joint portion of the second plate to each other.

2. The coupling device according to claim 1,
wherein a body of the pilot portion has an outer circumference length in a direction perpendicular to the extending direction, the outer circumference length being approximately uniform throughout the body of the pilot portion.

3. The coupling device according to claim 1,
wherein a body of the pilot portion has an outer circumference length in a direction perpendicular to the extending direction, the outer circumference length increasing as the body of the pilot portion is further away from the flat surface.

4. The coupling device according to claim 1,
wherein a body of the pilot portion has an outer circumference length in a direction perpendicular to the extending direction, the outer circumference length decreasing as the body of the pilot portion is further away from the flat surface.

5. The coupling device according to claim 2,
wherein the leading end of the pilot portion has a conical shape.

6. The coupling device according to claim 2,
wherein the leading end of the pilot portion comprises a protrusion provided at or around an axis of the pilot portion.

* * * * *